(12) United States Patent
Paris et al.

(10) Patent No.: US 6,432,486 B1
(45) Date of Patent: Aug. 13, 2002

(54) SURFACE TREATMENTS FOR ARTICLES AND VEHICLES

(75) Inventors: Henry G. Paris, Chattanooga, TN (US); Fenghua Deng, Richmond, VA (US); Charles L. Liotta; Charles A. Eckert, both of Atlanta, GA (US); Zhengui Liu, Greenville, SC (US)

(73) Assignee: Delta Airlines, Inc., Atlanta, GA (US)

( * ) Notice: Subject to any disclaimer, the term of this patent is extended or adjusted under 35 U.S.C. 154(b) by 0 days.

(21) Appl. No.: 09/554,590
(22) PCT Filed: Nov. 17, 1998
(86) PCT No.: PCT/US98/24404
§ 371 (c)(1),
(2), (4) Date: Aug. 15, 2000
(87) PCT Pub. No.: WO99/25485
PCT Pub. Date: May 27, 1999

Related U.S. Application Data

(60) Provisional application No. 60/065,758, filed on Nov. 17, 1997.

(51) Int. Cl.[7] ............................. B05D 1/08; B05D 3/02
(52) U.S. Cl. ..................... 427/447; 427/385.5; 427/421
(58) Field of Search .................. 427/384, 447, 427/421, 385.5

(56) References Cited

U.S. PATENT DOCUMENTS 4,744,913 A    5/1988   Salvador et al. ............. 252/70
5,268,117 A    12/1993  Fusiak et al. ................. 252/70
5,389,276 A    2/1995   Coffey et al. ................. 252/70

FOREIGN PATENT DOCUMENTS

DE         2734106         *    2/1979

OTHER PUBLICATIONS

Zhar Ostoikie Teplos Toikie Pokrytiya, 4th (1969), pp. 379–381, 1968.*

* cited by examiner

Primary Examiner—Erma Cameron
(74) Attorney, Agent, or Firm—Birch, Stewart, Kolasch & Birch, LLP

(57) ABSTRACT

A method treats an article and more specifically an aircraft surface in order to prevent icing and to provide a coating that emits very low volatile organic compounds (VOC) during application and setting. Icing on critical aircraft surfaces creates dangerous conditions that impair the stability of the aircraft. The specific areas are referred to as "cold-soak" conditions and some areas on the "leading edges" of the wings. The invention eliminates icing on these surfaces. Ice will not form on the surface of certain polymer coatings with low surface energy such as Teflon. This is a consequence of the high contact angle between the water droplet and the surface that establishes a non-wetting surface. The invention implements such coatings and a deposition process. The coating may be used for other objects such as automobiles, consumer products, such as refrigerators, stoves, etc.

18 Claims, 7 Drawing Sheets

SURFACE TREATMENTS FOR ARTICLES AND VEHICLES

Priority under 35 U.S.C. §119(e) is claimed of provisional United States application 60/065,758 filed on Nov. 17, 1997.

This application is the national phase under 35 U.S.C. §371 of PCT International Application No. PCT/US98/24404 which has an International filing date of Nov. 17, 1998, which designated the United States of America.

BACKGROUND OF THE INVENTION

1. Field of the Invention

A method and composition of matter for use as polymeric topcoats for articles and vehicles, such as, aircrafts, naval vessels, clothing and other industrial applications. With regard to an aircraft, "cold-soak" of the aircraft wing fuel tank leads to localized wing ice formation under certain environmental conditions. Also, ice forms on the "pleading edges" of the aircraft which detach and enter the jet engines or otherwise influence aerodynamic performance of aircraft wings. Conventional polymer paints and coatings contain a volatile organic content (VOC) that is under increasing regulation by EPA.

2. Background of the Invention

Since 1986, the limit for volatile organic content (VOC) of aerospace topcoatings as set by California Rule 1124 has dropped from around 700 g/l to its present limit of 420 g/l or even lower values. Increasing concern over the impact of organic compounds on the quality of life and environment can be expected to lead to further reduction in permissible VOC in coming years. Achieving durable, functional coatings that comply with the VOC regulations and satisfy functional coating requirements is becoming challenging for the aircraft industry and coating suppliers.

The southern California environmental control agencies require a maximum of 420 grams/liter of volatile organic compounds (VOC) from a coating material. The cyclic prepolymer coatings will reduce the VOC emissions during coating operation to less than 1 gram/liter of coating material. These new coating processes will provide a coatings technology that is environmentally compliant for the future, whereas existing solvent-borne technologies are compliant on a year-to-basis with a questionable future.

Conventional aircraft coatings used on commercial and military aircraft can be either water based or solvent based. Solvent based coatings are the most widely used. Typical solvents such as xylene, toluene and chlorinated aliphatic hydrocarbons, are required in order to control drying times, pigment distribution and surface smoothness of these coatings. These compounds all have unacceptably high VOC. Furthermore, xylene is a carcinogenic compound and the others are suspected hazardous materials both of which present serious employer liability issues. The EPA is strongly advocating a reduction of all solvents with the exception of water to reduce VOC and eliminate potential carcinogens. A water based coating is a natural alternative and has been developed for primer coatings but has yet to produce satisfactory performance as a topcoating. They contain small but significant amounts of VOC.

Historically, coating formulations meet the requirements by using "exempt" solvents, or by reclassifying coatings into other categories. Newer approaches for formulations and applications of coatings represented by the approach of the present invention can achieve a reduction of VOC well below 420 g/l, perhaps approaching as low as 0 g/l. This is achieved by using a new polymeric coating technology that will meet the most severe restrictions that are anticipated in the year 2010<100 g/l.

High solids deposition processes are based on water reducible, flame and plasma spray coating processes to implement low VOC coatings and deposition processes through a highly focussed research and development program.

Plasma spray and flame spray processes and flourinated polymer coatings have advantages because current solvent systems have definite limits for reduction of VOC. Although water-reducible systems have potential for further VOC reduction, they have a significant VOC content and may also exhibit adherence problems. A "super-critical fluid spray coating system" is capable of reducing VOC by 30–70 percent depending on the type of resins and polymers in the parent coating system. However, the equipment is expensive, complex and bulky, and the pigmentation of coatings using this process is limited.

Plasma spraying consists of depositing a coating by flowing a powder coating-inert gas mixture through an electric arc plasma. The thermoplastic powder liquefies and flows on the surface. The advantage of this coating process over air spraying of solvent-borne and water-borne coatings is that no solvent or VOC is produced. Also, many materials can be applied with low surface energies, such as chloro- and fluoropolymers which cannot be air sprayed. The disadvantage is that the process produces an ignition source which is hazardous around aircraft and flammable vapors and liquids. The actual cost of the plasma spray coating process is higher than conventional coating processes, but the service life of the plasma sprayed coating is longer and the coating can be thicker to compensate for wear. Lifecycle costs may be lower than conventional coatings. Typical foot-wear on the surface will not damage these coatings.

The plasma spray process is a mature technology and equipment is available for use. These coatings can be applied directly to aircraft aluminum surfaces to provide a non-icing surface. Limited colors are available in stock powders, but can be formulated for any color. In order to achieve an optimal coating it also will be necessary to formulate binders and pigments with specific properties.

For a thixotropic powder, particles need to coalesce quickly, ($t_c$ needs to be short) since $\eta$ is time dependent after deformation. The instantaneous viscosity, $\eta$, and particle radius, $r_p$, should be small and the surface tension, $\gamma$, large. For flattening, $\eta$, and particularly $r_p$ should be small; and $\gamma$ and particularly h should be large. (Additives may be able to reduce the surface tension, but viscosity seems the primary driver.) Low $\eta$ necessitates low molecular weight and higher temperatures, or slower catalysis rate.

Specific flatteners, pigments and other additives are necessary to make an effective topcoat from a resin (binder) promoting coating adhesion, providing ultra-violet (UV) radiation protection and color. These additives must be balanced against the requirements for coalescence and flattening, as increasing content of particulate in the coating increases viscosity. Several specific texts on paint chemistry for the production of a topcoat are available to guide coating formulation.

Two generic types of coatings are relevant, aircraft topcoatings and industrial maintenance (IM) coatings. Requirements for aircraft topcoatings are stringent. Typically, aircraft topcoat requirements are specified by the military specifications MIL-C-83286B, "Aliphatic Isocyanate Urethane Coating for Aerospace Applications", MIL-C-85285, "High Solids Polyurethanes", or Boeing Military Specifications such as BMS 10–60, "Protective Enamel."

An EPA reports summarizes the competitive low VOC coating processes and chemistries available in 1991; the principal ones being powder, waterborne, radiation curable and high solids coatings. The summary of this older reference still appears to represent a good economic and technical assessment of coating possibilities. This report also emphasizes that VOC from coating stripping operation is also considered one of the VOC consequences of the selection of method of coating. Table 1 summarizes coating/application methods and issues in this report.

TABLE 1

Comparison of Coatings/Application Methods

| Coating/Process Type | Applications | Advantages | Disadvantages |
|---|---|---|---|
| Waterborne coatings | metal coating automotive | low VOC, water cleanup low fire hazard | surface finish humidity control |
| Powder coatings | aerospace, automotive, metal | surface finish, low VOC, durability, transfer efficiency | cost, oven curing, color matching, Faraday effect |
| High-solids coatings | most applications | low VOC, color matching, transfer efficiency | short shelf and pot life, maintaining workable Viscosity |
| High Volume/Low Pressure Coatings | most applications | surface finish, transfer efficiency, low waste | uniform coverage on complex shapes |
| Electrostatic coatings | most applications | transfer efficiency, surface finish, low waste | non-conductive surfaces, humidity control needed, electrical ground needed |
| Flame spray coatings | most applications | low VOC, durable | fire hazard, poor surface finish, color match |
| UV-curable coatings | metal coating electronics graphic arts | durable, less material used low VOC | toxicity, application problems cost |
| Supercritical coatings | most applications | low VOC, surface finish, mass use | cost, requires new formulations, spray equipment |

Besides the genre of application for coatings, the actual deposition method is an important element in controlling VOC. High solids coatings, for example, achieve low VOC by eliminating the solvent classically used for coalescence, flow and flattening. They rely instead on mechanisms such as thermal or kinetic energy to achieve these ends water-based coatings replace organic solvents with water.

The EPA sets forth VOC requirements for industrial maintenance coatings, namely, primers, sealers, topcoats, etc., used in outdoor aggressive environments on structures such as bridges, ships, and hydraulic structures. The proposed VOC limit was 350 g/l; and the 2004 limit (proposed) was 300 g/l.

This reports describes in detail the VOC measurement methodology (EPA Reference Method 24, a distillation of ASTM standard test methods) and describes the calculation of VOC emissions. Manufacturers claim that the ASTM D-2369 can produce inordinately high VOC levels, particularly in marine and architectural coatings, as it requires the coating to be heated to 110 C. (230 F.) where excessive loss of volatile components by coating decomposition may occur.

Camouflage topcoatings must meet low VOC requirements and also very stringent chemical agent resistance requirements. These requirements consist of resistance to chemical decontamination/wash as well as other severe requirements.

The baseline coating is a two components solvent-borne polyester/polyisocyanate binder system that is lead, chromium, 1,1,1 trichlorethane free. This candidate new "low VOC" coating is a waterborne/dispersible/reducible coating using polyisocyanates and polyesters from Miles, Inc. including Bayhydrol XP-7044 WD polyester, Bayhydur XP-7007 WD polyisocyanate and de-ionized water reducer as needed.

Typical fillers are cobalt green spinet, chromium oxide, magnesium ferrite and carbazole violet pigments with diatomaceous silica, magnesium silicate and amorphous silica extender pigments. These pigments are added to the polyester component and polyisocyanate is diluted with suitable solvent to meet viscosity of both components and meeting stoichiometry.

This coating met all requirements of specification except CAR (chemical agent resistance). VOC is estimated to be ~300 g/l. A fundamental problem of these WB/WD/WR coatings is film porosity that allows chemical agents to penetrate the coating. The CPVC (critical pore volume content) appears to determine gloss. A high CPVC value in the candidate coating is a problem for CAR. The author of the study cites the strategy for improving the CPVC is use of additives to improve wetting/flow/dispersion in this WB/WD/WR system.

It would appear that a well designed, low VOC aircraft topcoat may also met CARC requirements.

Table 2 outlines the basic performance characteristics of aircraft coatings.

TABLE 2

Performance Characteristics of Aircraft Coatings

| Property | Primer | Topcoat | Self-Priming Topcoat |
|---|---|---|---|
| Gloss (60°) | | | |
| High Gloss Color | | 90 minimum | 90 minimum |
| Low Gloss Color | | 6 maximum | 6 maximum |
| Wet Tape Adhesion | No removal, 1 day, 23° C. | No removal, 1 day, 23° C. | No removal, 1 day, 23° C. |
| Flexibility | | | |
| GE Impact | | | |
| High Gloss Color | | 60% | 40% |
| Low Gloss Color | 10% | 20% | 20% |
| Mandrel Bend (−51° C.) | | | |
| High Gloss Color | | 0.95 cm. | 0.64 cm. |
| Low Gloss Color | | 1.27 cm. | 0.64 cm. |
| Humidity Resistance (95% RH/49° C.) | | 30 day | 30 day |
| Fluid Resistance | | | |
| lubricating oil | 1 day (121° C.) | 1 day (121° C.) | 1 day (121° C.) |
| hydraulic fluid | 1 day (65° C.) | 1 day (65° C.) | 1 day (65° C.) |
| distilled water | 4 day (49° C.) | 4 day (49° C.) | 7 day (49° C.) |
| Corrosion Resistance | | | |
| 5% NaCl salt fog | 2000 hr. | 2000 hr. | 2000 hr. |
| $SO_2$/Salt fog | | | 500 hr. |
| filiform | 1000 hr. | 1000 hr. | 1000 hr. |
| Weather Resistance | | | |
| accelerated (ASTM G26) | | 500 hr. | 500 hr. |
| Outdoor FL exposure | | 1 year | 1 year |

Regulatory bodies tend to restrict the use of deposition systems that have low transfer efficiency. The California AQMD regulations require minimum transfer efficiencies of 60–85% and maximum gun tip gas pressure of 10 psi. Currently, only HVLP and electrostatic spray processes can meet these requirements.

Existing levels of corrosion protection should be maintained with new low VOC topcoats. Corrosion (aqueous) requires the presence of water, cations and oxygen. strontium chromate is an important additive to inhibit corrosion. Coating strategy has been to achieve a physical barrier between the substrate and the external environment to prevent moisture and radiation induced coating degradation.

Since moisture egress is a virtual certainty, coating adhesion becomes a very important coating characteristic. The mechanism of adhesion is either chemical or physical. Although chemical pretreatment of the surface substrate can enhance secondary chemical bonding, and in some cases even achieve primary bonding, the major adhesion mechanism is the mechanical interlocking of the coating with the microscopic surface roughness created in anodizing.

The practical lifetime of a military or commercial coating is 4–8 years. This lifetime requirement imposes significant demand for resistance to environmental degradation.

Traditionally an epoxy primer and polyurethane topcoat are used for aircraft applications. Epoxy primer/polyurethane topcoatings are highly refined to meet the military requirements. Since epoxides are brittle and have very low UV stability, they are used as a primer and the external coating provides the UV protection. The epoxide coatings provide superior resistance to moisture penetration and subsequent corrosion. The combination of the two also has very low water absorption, vapor transmission rate and UV resistance.

Aliphatic isocyanate and polyester are highly developed UV resistant topcoatings and their literature is well documented. Typical aircraft topcoats have a dry film thickness of 0.002+/−0.0003 inch (50.8+/−7.8 micrometers). Set and hard dry time is typically 2 and 6 hours, respectively. Fully developed properties may not be attained until about 7 days aging.

Fillers such as talc and mica are used to provide an oriented distribution to serve as secondary radiation and physical barriers, silica and metal silicates, carbonates and sulfates are added as physical fillers that reduce gloss and increase opacity.

Water-borne coatings are one approach to compliant coatings. The primary strategy is to achieve a solution of emulsion of polymer powders whose surfaces are modified with hydrophilic groups. The major difficulty with waterborne coatings is that the use of water as a solvent leads to more porous coatings and adhesion problems related to organic surface contamination.

High solids or powder coatings are also one route to achieving low VOC levels. One approach is to reduce the solvent content of the coating, but this shortens pot life and greatly increases viscosity. These factors increase surface roughness. By moving to lower molecular weight resins, one can achieve improved viscosity and flatter coatings. However, polyisocyanate cured powders have shorter pot life and reduced flexibility due to the more rapid and extensive cross linking due to the lower molecular weight. One strategy to improve this is to use polymers with very narrow molecular weight distribution.

An EPA study and a follow-up publication evaluated six (6) coatings. The six types are solvent-borne polyurethane, waterborne epoxy primer w/latex topcoat, solvent alkyd primer/waterborne acrylic, 2 component polysiloxane topcoat, water reducible alkyd primer/acrylic topcoat and solvent alkyd primer/solvent alkyd enamel (standard baseline). The study compared impact, adhesion, pencil hardness and solvent tests and outdoor exposure tests of these coatings. The VOC data from candidate coatings in this study is useful for aerospace topcoats. Of particular interest in this assessment of IM coatings is the determination that a two component polysiloxane coating with a low VOC of about 84 g/l performed extremely well. These two studies showed the polysiloxane coatings exhibited the best VOC levels and performance in environmental testing.

A second study is also grouped in the IM coatings discussion. Although the study intended to coat F-15 aircraft, only ground vehicles were coated. It consisted of an evaluation of supercritical spray coating and a high pressure-low volume (HPLV) process called ULV (ultra low volume) spraying. The polyurethane coatings had a baseline VOC of about 420 g/l which is too high for current requirements. The study found the supercritical coating process to be unacceptable for field use, and found that the ULV process reduced emissions by about 50%, primarily by reducing the total paint sprayed in the coating process. This result shows that both the coating process itself as well as the formulation of the coating can have significant impact on total VOC emission. This study attempted to spray high solids coatings unsuccessfully. The major problem encountered was very slow drying. This was a result of an improper level of catalysts in the coating.

IM coatings for bridges using principally an epoxy mastics and silicone rubbers, that are not particularly relevant to aircraft topcoats, were evaluated. Cyclic salt-fog/freeze provided a relatively rapid method to differentiate coating performance in a short time period. Specific VOC content was not stated, but all the evaluated coatings were at or below 340 g/l. A "low-VOC" acrylic aliphatic polyurethane topcoat exhibited the best gloss retention.

SUMMARY AND OBJECTS OF THE INVENTION

The basic objectives of this invention are to produce a polymeric binder or matrix for a coating with extremely low, or zero VOC content that can be used as a top coat for many applications and in aircraft applications to achieve specific coating characteristics to prevent icing of aircraft wings. Icing on critical aircraft surfaces may create a condition which might impair the stability of the aircraft. The specific areas are referred to as "cold-soak" areas and some other areas on the "leading edges" of the wings and engine nacelles. The present invention eliminates the adhesion of ice on these surfaces. Environmental icing due to weather is a related problem, but is not the direct problem concerning the present invention.

Ice will not adhere to the surface of certain polymer coatings with low surface energy such as Teflon. This is a consequence of the high contact angle between the water droplet and the surface that establishes a non-wetting surface. One objective of the present invention is to implement such coatings and a deposition process. Effective implementation will also result in a coating formulation and deposition process, with a very low VOC emission.

Coatings formulations for prevention of icing problems includes the following properties:

Low surface energies to prevent icing.

Adhesive to aircraft surfaces.

Protection of substrates from corrosion.

Resistance to jet fuel and hydraulic fluids.

Other properties for coatings specifications.

Coating materials are selected for low surface energy properties and general coating properties. The coating materials are polymerized fluoropolymers that possess good low temperature properties, e.g., do not embrittle at −45° C., and do not soften at elevated temperatures of 90° C.

Two parallel benefits of this approach may be achieved. The coating process is potentially adaptable for coating an entire aircraft or other commercial item. The combination of the coating process and the coating formulation reduces volatile organic compounds (VOC) well below the current Environmental Protection Agency (and California) limits for the forseeable future.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Cyclic prepolymers for low VOC coatings provide the advantages of cyclic prepolymers as ultra-low, potentially near zero VOC coatings.

Figure 4:
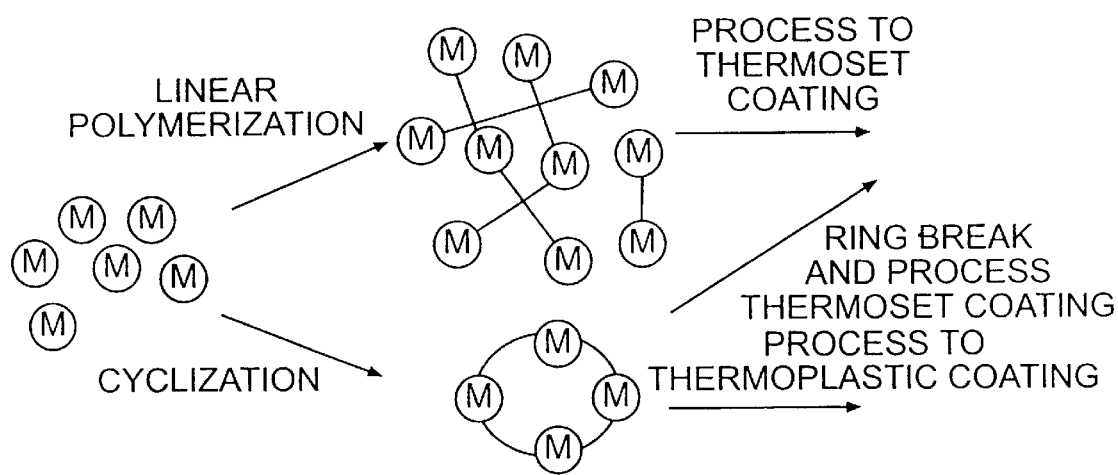
FIG. 4 illustrates a comparison of conventional and cyclic polymerization. The cyclic structure allows much lower viscosity than the linear (tangled) polymers, and can be processed as a thermoplastic or thermoset coating.

Binders manufactured from cyclic prepolymers provide advantages to reduce VOC. FIG. 4 illustrates a very simple exhibit of the difference between linear and cyclic polymerization. The starting cyclic prepolymer can have appreciably lower viscosity than the linear prepolymer at the same temperature due to the morphological structure of the former. The cyclic behaves as a thermoplastic until the ring structure is broken and polymerization begins.

A classical condensation or step-growth polymerization is illustrated below. The key point is that volatile ROH functional groups are necessary by-products of condensation polymerization. Cyclic prepolymers do not follow this polymerization route.

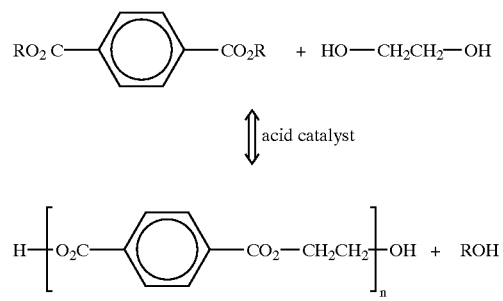

A cyclic ET prepolymer of 3–6 units can be acid catalyzed without the formation of volatile byproducts. This is a powerful way to create thermosetting coatings without classical condensation reactions. These prepolymers behave as thermoplastic species until ring opening is initiated.

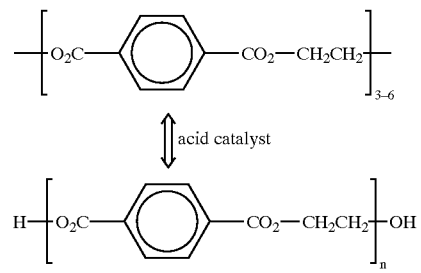

The classical condensation or step-growth polymerization provides for every ester functionality formed in the polymer a volatile ROH is produced. The cyclic polymerization of cyclic prepolymers provide polymerization by breaking the 3–6 unit cyclic prepolymer without producing any volatile products.

A description of the production of polycarbonate from thermoplastic cyclic prepolymer resin to be used in thermoplastic and thermoset composites is available. The following illustrates the route of polymerization of bisphenol-A polycarbonate. The description sets forth a process using phosgene as the starting materials. The present invention synthesizes samples of the cyclic material, where we replace phosgene with the more easily handled solid, triphosgene.

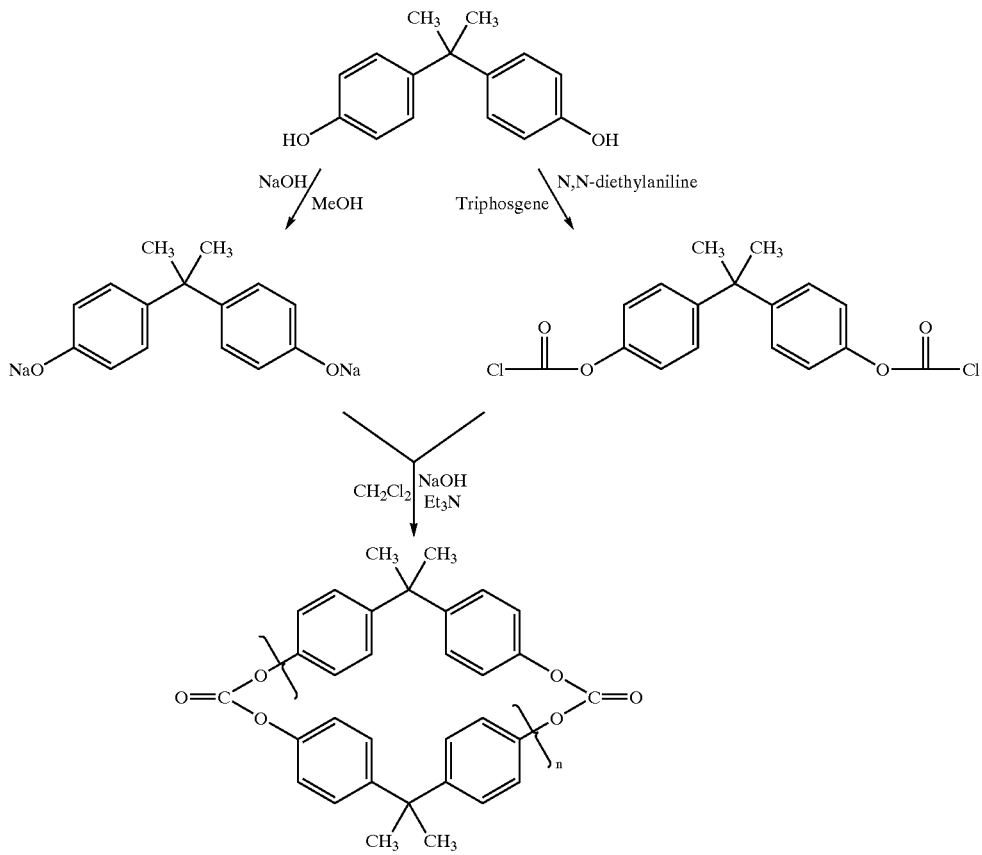

n = 1,2,3...

The cyclic prepolymer, usually 1–20 unit mers melts at 200–250° C. forming a melt of very low viscosity, ~10 poise at 250° C. (For reference the viscosity of water is 0.01 poise and honey is 500 poise.) In the presence of a suitable initiator or catalyst the polymer ring opens and crosslinking is initiated producing polymers of 400 or more units within a very short time period (on the order of seconds to minutes).

Elements of this patent described in the basic elements of how such prepolymers can be used in a coating formulation.

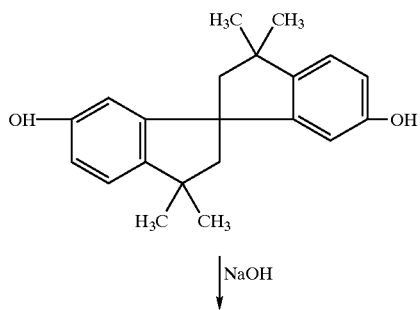

-continued

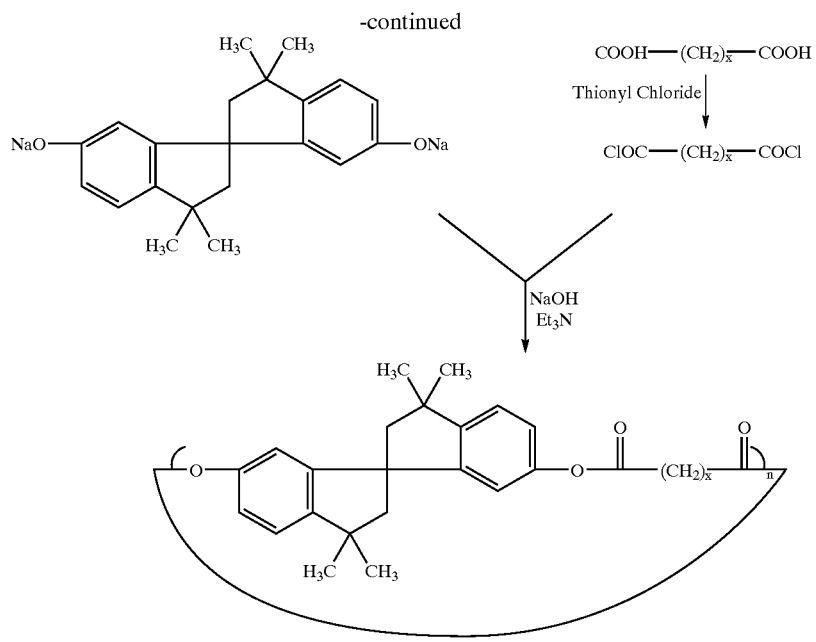

X = 2, 4; n = 1, 2, 3...

The above is a scheme for the synthesis of proposed polyester cyclics starting with spiro(bis)indane and adipic acid.

A polymeric topcoat according to the present invention provides a low volatile organic content (VOC) and may utilize the following polyester cyclic prepolymer PE1 as a starting point:

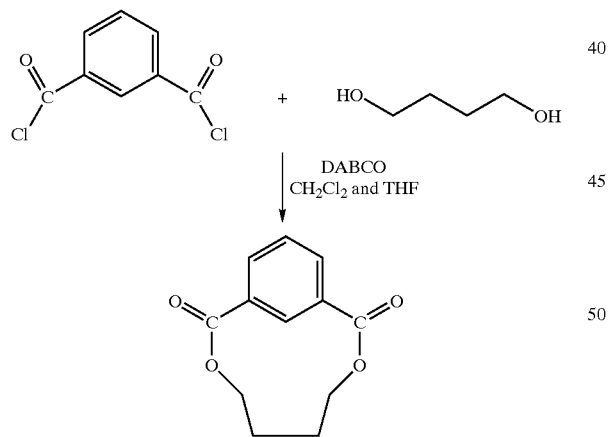

The above starting material undergoes a reaction to form the following cyclic structure 1-PE2 with a melting point of approximately 190°C.:

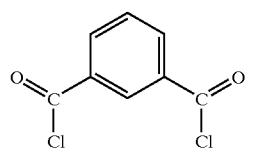

-continued

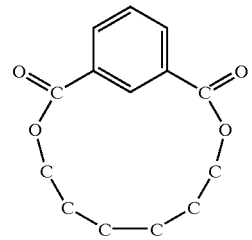

Thereafter, a low volatile organic content (VOC) coating PE3 synthesis is formed:

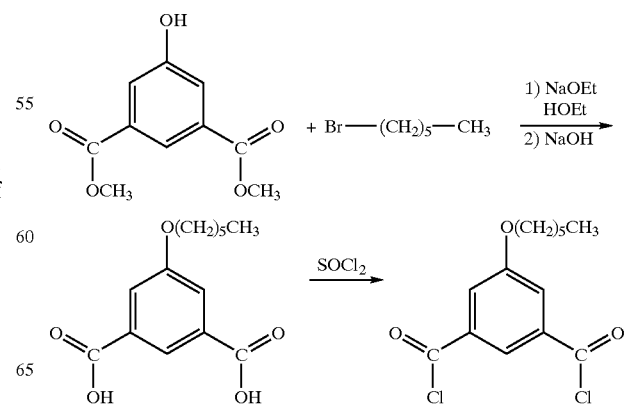

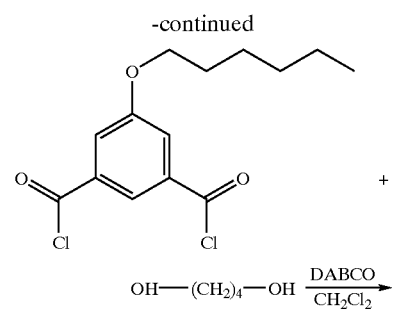
+
OH—(CH$_2$)$_4$—OH $\xrightarrow[\text{CH}_2\text{Cl}_2]{\text{DABCO}}$ TARGET CYCLIC
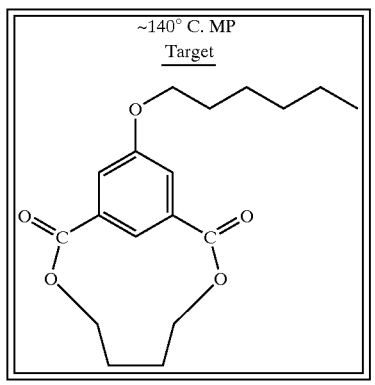
In forming the target cyclic, a cross linking cyclic may be added:
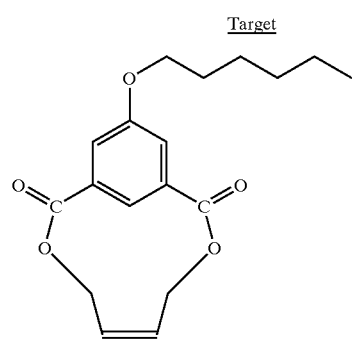
By substituting dichloride, the following PE4 synthesis may be formed:
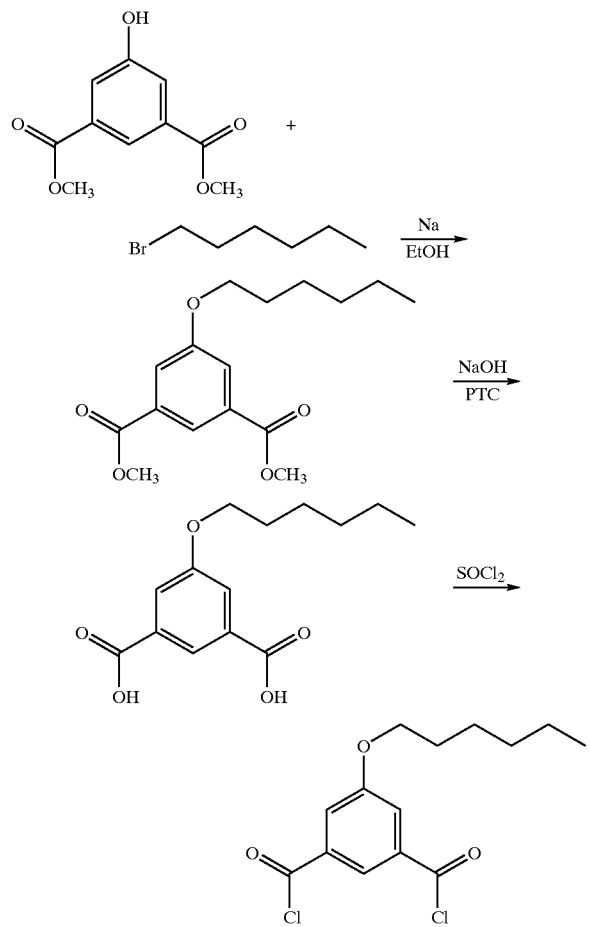

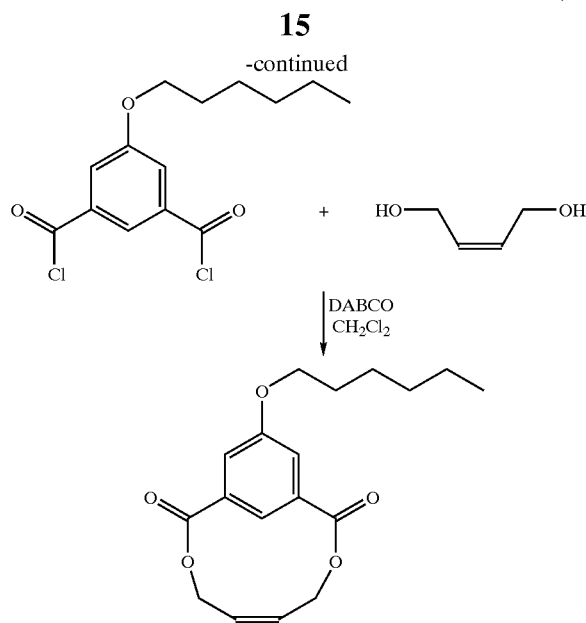
The characterization of the PE4 synthesis produces a melting point of approximately 90° C. with a cross linking cyclic.
The following is the synthesis of PE5 utilizing a substitute dichloride:
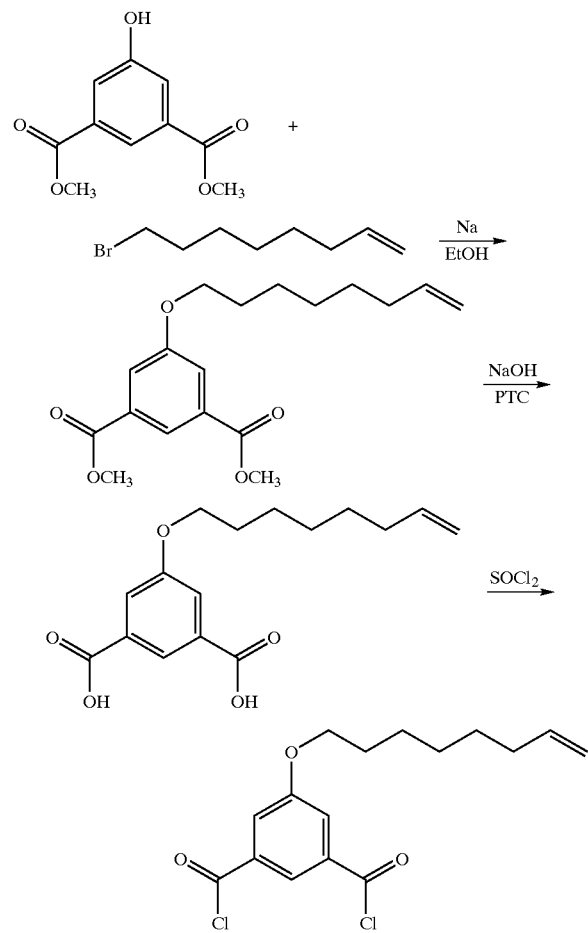

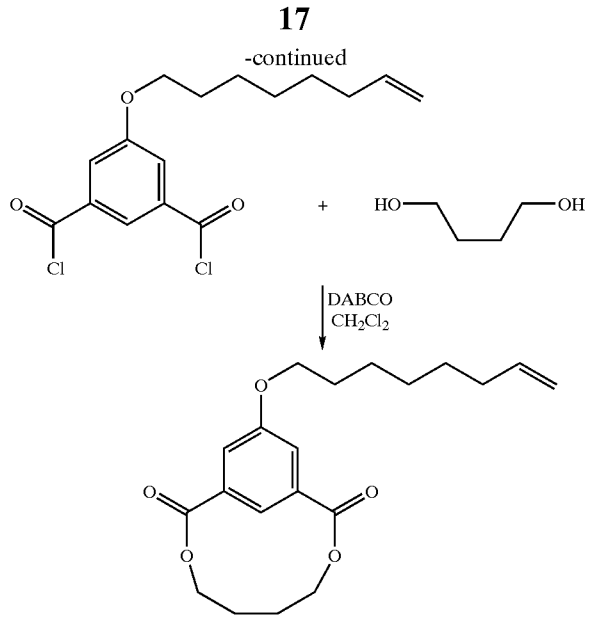

Accordingly, in one aspect of the present invention there is provided, a low volatile organic content coating process, comprising the following steps:

a. selecting cyclic prepolymers from the group consisting of polyester, polycarbonate and polyurethane with low melting range solids and liquids;
b. applying the cyclic prepolymers to a surface by a thermal spray or a conventional spray method which uses heat of thermal deposition;
c. ringbreaking the cyclic prepolymers with a catalyst or heat to polymerize the cyclic prepolymers, while substantially avoiding the evolution of volatile organic content; and
d. heat curing the cyclic prepolymers to complete polymerization of the cyclic prepolymers, to thereby form a tough and durable coating on said surface.

Likewise in a second embodiment of the instant invention there is provided a low volatile organic content coating process, comprising the following steps:

a. selecting cyclic prepolymers from the group consisting of polyester, polycarbonate and polyurethane with low melting range solids and liquids;
b. ringbreaking the cyclic prepolymers with a catalyst or heat to polymerize the cyclic prepolymers, while substantially avoiding the evolution of volatile organic content to form a compound;
c. applying the cyclic prepolymers to a surface by a thermal spray or a conventional spray method which uses heat of thermal deposition; and
d. heat curing the cyclic prepolymers to complete polymerization of the cyclic prepolymers, to thereby form a tough and durable coating on said surface.

The terms "low volitile organic content" and "while substantially avoiding the evolution of volatile organic content" as used above in reference to the inventive processes, each refer to the ability of the present inventive processes to produce a coating of the instant invention, without causing the evolution of a significant amount of volitile organic content during ringbreaking and crosslinking of the prepolymers.

The difference between the above two processes provided is that in the first, ringbreaking occurs after applying the prepolymers to a surface, whereas in the second process, ringbreaking occurs prior to applying the prepolymers to a surface. Of course, if so desired one could also perform ringbreaking in any combination of before, during or after the applying of the prepolymers to a surface, without departing from the inventive methods herein disclosed Additionally, a process of manufacturing a low VOC coating using cyclic prepolymers would include the steps of selecting cyclic prepolymers from the group consisting of polyester, polycarbonate and polyurethane with low melting range solids and liquids. Using ringbreaking catalyst and crosslinking agents to polymerize the cyclic prepolymers without the evolution of VOC to form a compound. Applying prepolymer-ringbreaking catalyst crosslinking agents by thermal spray or conventional spray methods using heat of thermal deposition. Heat curing to complete polymerization and of desired crosslinking, and applying thermosetting or thermoplastic coating materials.

Cyclic organic prepolymers of ester, urethane and other types with low molecular weight organic compounds with very low liquid viscosity are heated or a suitable catalyst is used to break the cyclic ring, these materials polymerize into polyesters, polyurethane and other polymers without evolution of VOC, the modified prepolymers produce low viscosity liquids mixed with crosslinking agents to form tough, durable coatings of chemistry similar to conventional linear polymer coatings, without evolving VOC. The process may utilize any suitably designed cyclic prepolymer that can be polymerized and crosslinked to impart hardness, toughness and environmental durability.

Cyclic polyester prepolymers are synthesized with substituted groups containing double bonds to form thermosetting, crosslinked coatings, fluorinated side groups are added to control the surface energy properties of polymer coatings. When heat or a suitable catalyst is used to break the cyclic ring, these materials polymerize without evolution of VOC. The modified prepolymers produce low viscosity liquids which when mixed with additive crosslinking agents form tough, durable coatings of chemistry similar to conventional linear polymer coatings, without evolving VOC.

The present invention also provides herein for novel cyclic prepolymers that are prepared by a process that comprises reacting together under an inert atmosphere in an organic based solvent system:

(a) a butanediol or a hexanediol, and
(b) a cyclic moiety having a cyclic ring structure containing 4–8 carbon atoms that is substituted with (i) a pair of chloro substituted alkyl or chloro substituted acyl groups and (ii) a substituent containing an unsaturated bond,.

Such cyclic prepolymers include, for example, the following.

A cyclic polymer based upon a substituted dichloride alkyl group with attached side group containing a cyclic structure of 4–8 carbon atoms and forming a thermoplastic material, and which is useful as a binder in a coating matrix.

A cyclic polymer based upon a substituted dichloride alkyl group with attached fluorinated side group to control surface properties containing a cyclic structure of 4–8 carbon atoms and forming thermoplastic materials, and which is useful as a coating binder in a coating matrix.

A cyclic polymer based upon a substituted dichloride alkyl group with attached side group containing an unsaturated bond and containing a cyclic structure of 4–8 carbon atoms, the unsaturated bond allowing crosslinking to form a thermosetting material, and which is useful as a binder in a coating matrix.

A cyclic polymer based upon a substituted dichloride alkyl group with attached side group and containing a cyclic structure of 4–8 carbon atoms containing an unsaturated bond to allow crosslinking to form a thermosetting material, and which is useful as a binder in a coating matrix.

When using a substituted cyclic polymer as a coating binder, a cyclic polymer is based upon a substituted dichloride alkyl group with attached fluorinated side groups to control surface properties and containing a cyclic structure of 4–8 carbon atoms containing an unsaturated bond to allow crosslinking to form a thermosetting material used as a binder, matrix. Any of the above-identified type cyclic materials containing a cyclic structure of greater than 4–8 carbon atoms imparts lower melting ranges. Any of the above-identified cyclic materials may also contain a catalyst used for breaking the cyclic structure with or without the use of heat or other energy, for example, ultra-violet radiation, to accelerate the polymerization. Any of the above-identified materials may also contain a catalyst used for crosslinking with or without the use of heat or other energy, for example, ultra-violet radiation, to achieve crosslinking.

The polymer used according to the present invention may be a cyclic prepolymer based on a polyester structure with a fluorinated ligand attached to the compound. This type of prepolymer is designed to be used as the binder of a coating system. The prepolymer can be designed with a melting range that provides for the prepolymer to be applied as a liquid at normal room temperature, and subsequently heated by external sources such as infrared lamps, other radiant heat sources, an electron beam, or ultraviolet (UV) radiation. In addition, the prepolymer may be applied as a molten liquid heated in a spray gun designed for this purpose. The advantage of the use of the cyclic molecular structure with a fluorinated ligand is that it imparts low viscosity being a liquid at normal room temperature, which facilitates the application of the coating, and modifies the surface properties of the applied coating, for example to prevent the accumulation of ice on aircraft wings. An additional advantage of the coating is that it can be polymerized and hardened by the use of suitable catalysts that break the cyclic ring structure without the use of strong and volatile organic solvents that pollute the atmosphere, reduce air quality and/or may contribute to ozone depletion as a result.

The class of compositions of matter of the present invention may be used as a polymeric topcoat for an aircraft. The compositions may be used in the clothing industry and other industrial applications. The compounds may be used as a coating for the hulls of ships to reduce friction and for a coating to control fouling by bio-organisms.

The materials are the class of candidate organic cyclic prepolymer compounds that indicate very high promise to specific end-product requirements for coatings.

These cyclic prepolymers offer attractive characteristics. By producing prepolymer material of 3–10 units in cyclic form, it is possible to obtain a thermo-plastic like material that exhibits very low viscosity with limited heating as is required in a coating to achieve substrate wetting, adhesion, coalescence and flattening. By use of suitable catalysts, the rings can be subsequently broken and the linear chains cross-linked to obtain a thermosetting high viscosity binder without the use of an added volatile solvent. These materials are used in order to explore the feasibility of producing specific coating binders.

A conventional coating consists typically of a functional part, i.e., the solid polymer, and a solvent. The solvent itself consists of two types, a coalescing part and a diluent part. The solid polymer is the binder, or matrix, for any pigments or other functional additives, such as UV absorbers and flattening agents. The solvent must accomplish two things. A relatively volatile constituent lowers the as sprayed coating viscosity to the point it may be dispersed in small droplets and wet the substrate. A less volatile, slowly evaporating solvent promotes coalescing of individual droplets and slows setting, so that flow, flattening and polymerizing can occur before the coating takes a set. The use of solvents in classical polyurethane-based coatings and primers is the primary source of high VOC. Typical high volatile solvents are hexane, methyl ethyl ketone, methanol, 1, 1,1-trichloroethane, toluene, methyl isobutyl ketone, 2-nitropropane and xylene.

The use of polymerization reactions inevitably leads to the formation of volatile reaction by products. New low VOC coating methods must accomplish adhesion, coalescence, flow, flattening and hardening, while maintaining the necessary functional additives in proper configuration. To achieve ultra-low levels of VOC requires elimination of organic solvents and the volatile ROH during polymerization by new polymerization strategies.

Flattening of the coating on the substrate is a major factor in coating development. A basic model for flattening takes into account powder size, viscosity and surface tension.

This is a two step model based on particle coalescence followed by fluid flow and flattening, or leveling. The time to achieve coalescence is:

$$tc = f(\eta r_p / \gamma)$$

where f is a constant, $\eta$ is the viscosity of the particle, $\gamma$ is the surface tension of the particle, f is a constant and $r_p$ is the average particle radius. Flattening of the coalesced particles follows a model:

$$\ln(a_o/a_1) = K(h^3 \gamma / \lambda^4 \eta)_o \int^1 dt,$$

where $a_o$ is the initial maximum coating roughness, more or less equal to $2r_p/3$, $a_1$ is the roughness height at time, t, $\lambda$ is the roughness period, nominally equal to $r_p$, $\eta$ is the viscosity of the particle, $\gamma$ is the surface tension of the particle, K is a constant and h is the average film thickness.

The present invention is directed to the use of a cyclic, fluoro-prepolymer as a binder for a topcoat that allows significant reduction, or the elimination of volatile organic emissions during a coating application and anti-icing characteristics. The use of the fluoro-prepolymer also achieves a low viscosity such that the binder is a liquid at normal room temperature. This allows the application of a coating by standard spray and brushing methods, rather than the use of heated sprays as is required with other cyclic prepolymer binders, such as polyester-based materials, that have higher viscosity. The low room temperature viscosity also allows for the use of more standard catalysts for cross-linking. Such more standard catalysts are not stable at higher temperatures needed to achieve desirable viscosity in materials based on polyester cyclic prepolymers.

A cyclic polyester prepolymer designated PE1E1 has the following schematic:

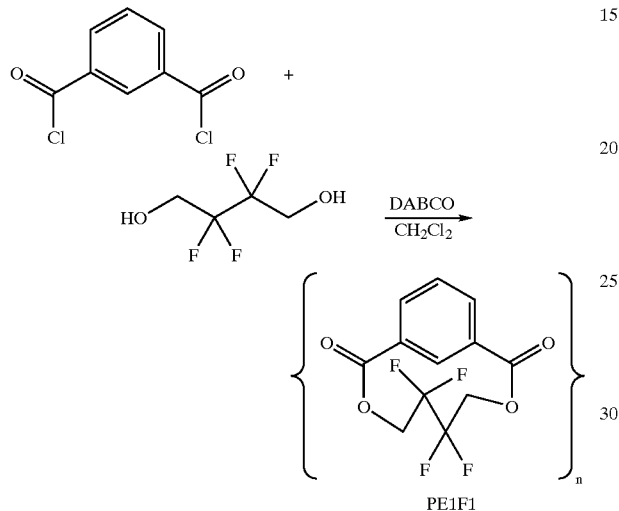

Figure 1:
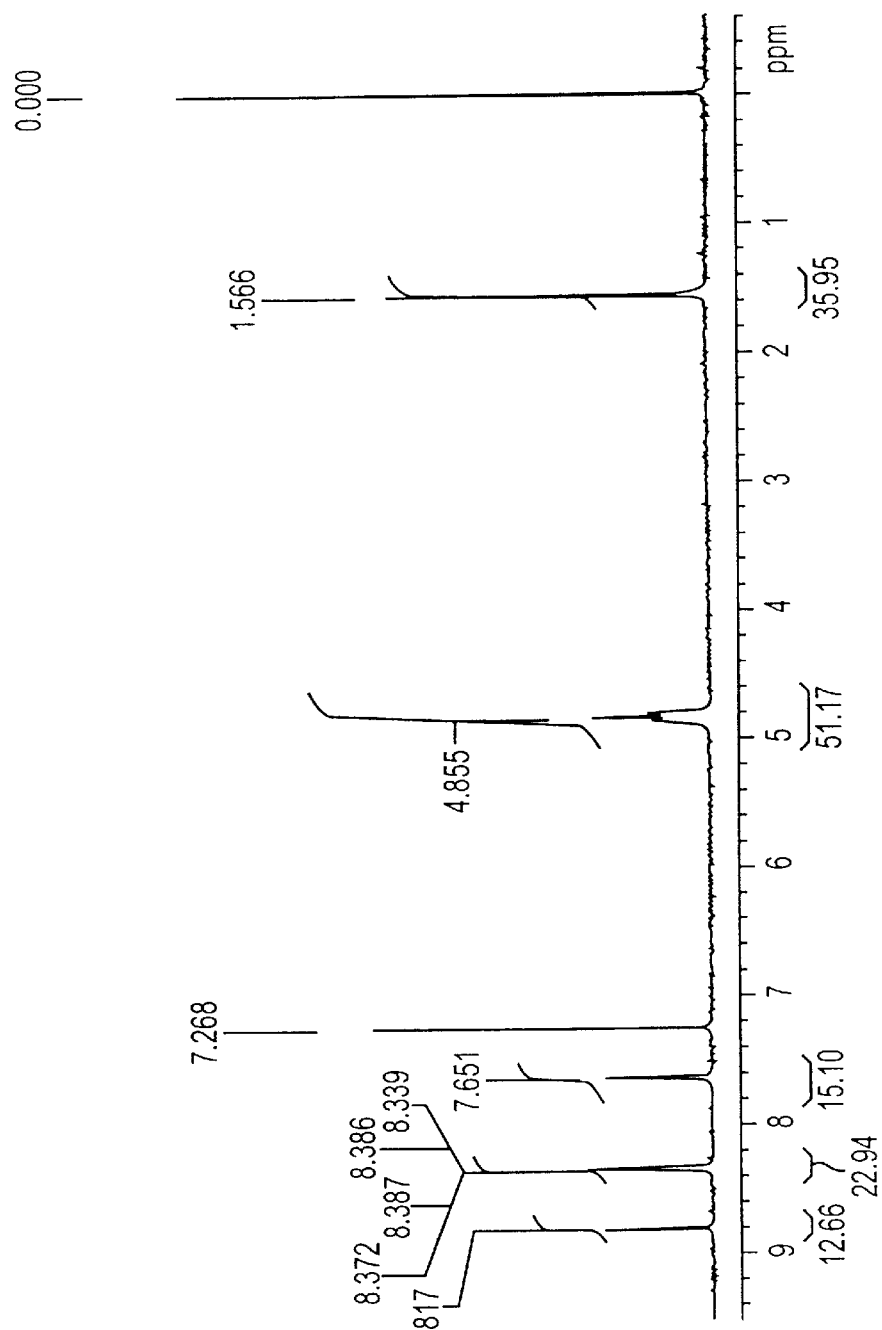
FIG. 1 is a graph of a NMR spectrum for a preferred cyclic prepolymer designated PE1F1.

A three-necked round-bottomed flask is fitted with a big stirring bar, nitrogen purge and septum for reagent addition is charged with 100 ml of methylene chloride and 5.0 grams (50 mmol) of 1,4-diazobicycle[2,2,2]octane(DABCO). The mixture is cooled to less than 0° C. They are separately added in a nitrogen atmosphere over 30 minutes. With stirring, a solution of 1.62 grams 2,2,3,3-tetrafluoro-1, 4-butanediol (10 mmol) in 5 ml of anhydrous THF and 15 ml of anhydrous methylene chloride, and a solution of 2.03 grams (10 mmol) of isophthaloyl chloride in 20 ml of methylene chloride. Stirring is continued for 5 minutes after adding is completed, and then 2 ml of methanol is added to quench the reaction. Thereafter, 50 ml of 1.0M HCl solution is added and stirred for another 5 minutes. The aqueous layer is washed with methylene chloride. More HCl solution is added to wash the combined methylene chloride solution. It is then washed with a saturated sodium chloride solution. After evaporation of methylene chloride, the residual is recrystallized with a mixture of ethyl ether and methylene chloride. A white solid of 1.3 grams is obtained. (Yield: 45%, M.P.: 236–237° C.). See FIG. 1 for an illustration of a NMR spectrum of the above cyclic prepolymer.

A cyclic polyester prepolymer designated PE3F1 has the following schematic:

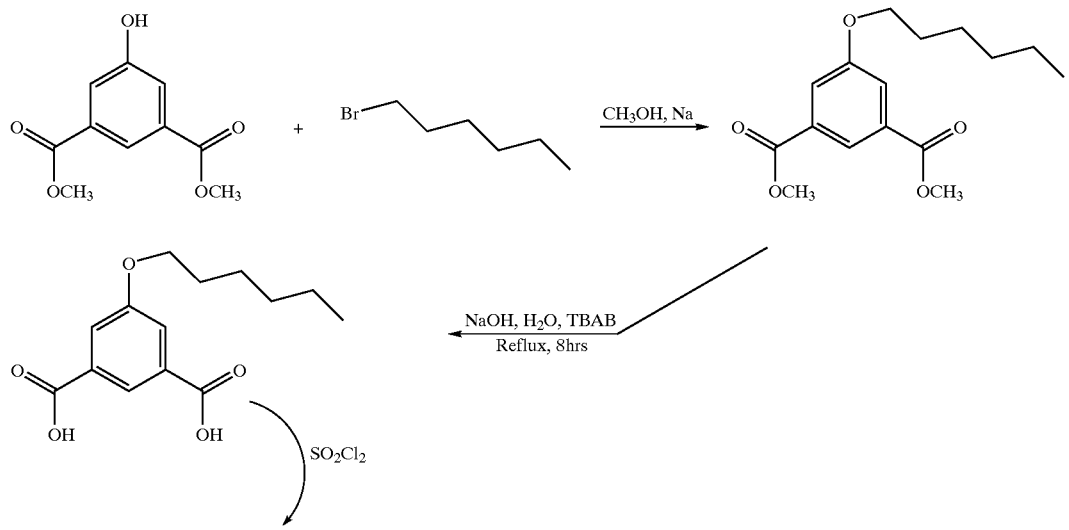

-continued

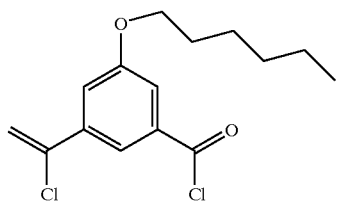 + 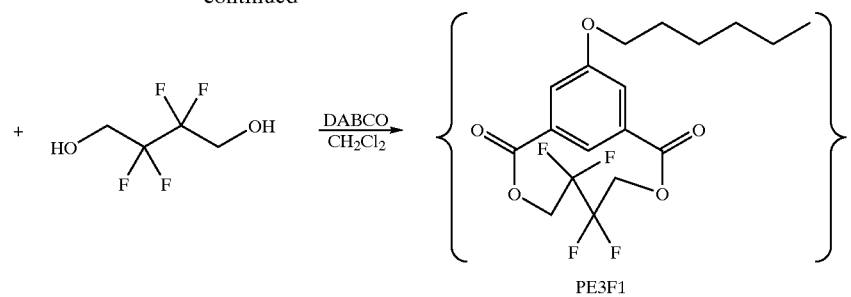

Figure 2:
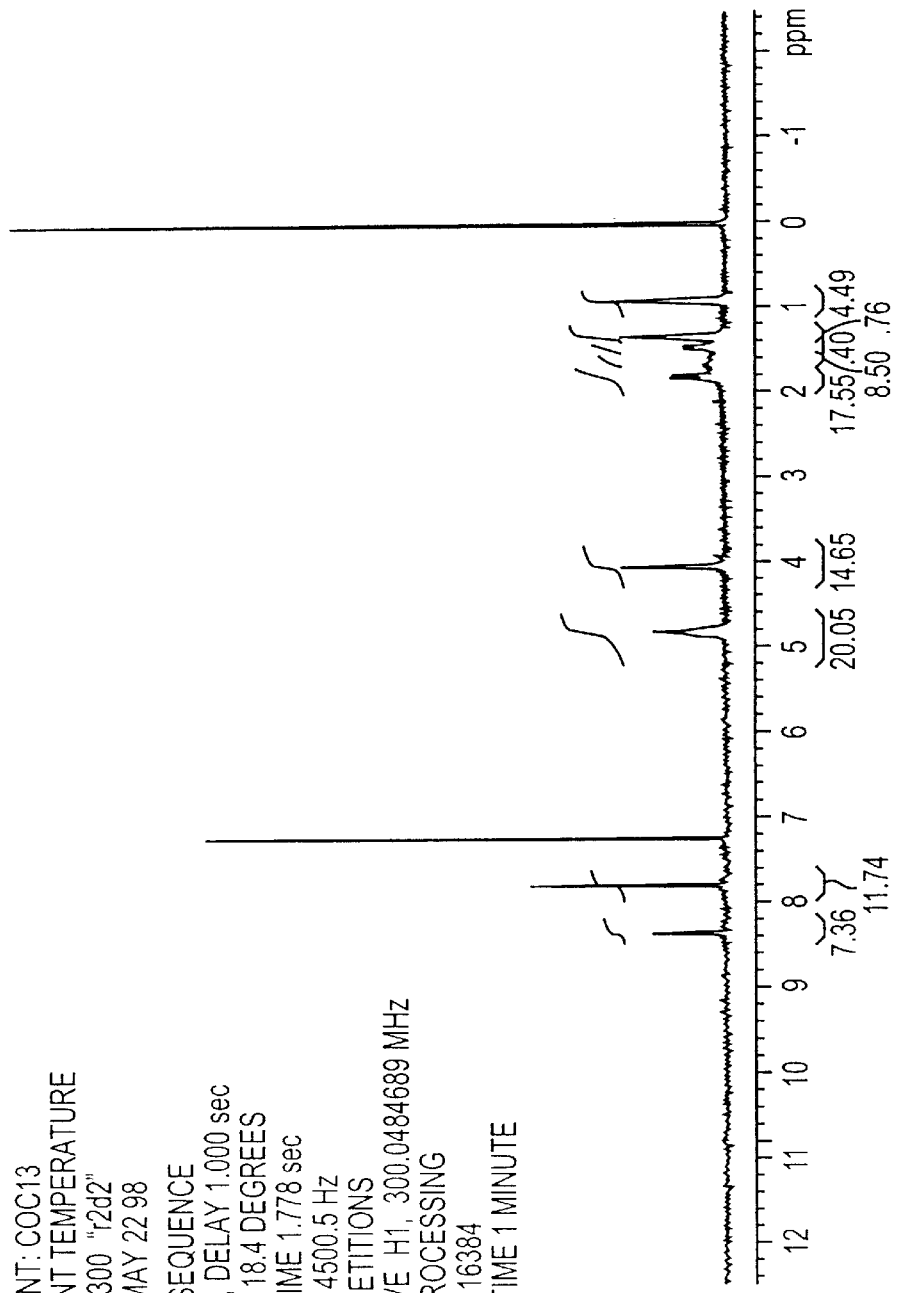
FIG. 2 is a graph of a NMR spectrum for a preferred cyclic prepolymer designated PE3F1.

A three-necked round-bottomed flask is fitted with a big stirring bar, nitrogen purge and septum for reagent addition is charged with 100 ml of methylene chloride and 5.0 grams (50 mmol) of 1,4-diazobicycle[2,2,2]octane(DABCO). The mixture is cooled to less than 0° C. They are separately added in a nitrogen atmosphere over 30 minutes. With stirring, a solution of 1.62 grams 2,2,3,3-tetrafluoro-1,4-butanediol (10 mmol) in 5 ml of anhydrous THF and 15 ml of anhydrous methylene chloride, and a solution of 2.03 grams (10 mmol) of 5-hexoxyl-isophthaloyl chloride in 20 ml of methylene chloride. Stirring is continued for 5 minutes after adding is completed, and then 2 ml of methanol is added to quench the reaction. Thereafter, 50 ml of 1.0 M HCl solution is added and stirred for another 5 minutes. The aqueous layer is washed with methylene chloride. More HCl solution is added to wash the combined methylene chloride solution. It is then washed with a saturated sodium chloride solution. After evaporation of methylene chloride, the residual is recrystallized with a mixture of ethyl ether and methylene chloride. A white solid of 2.0 grams is obtained. (Yield: 55%, M.P.: 160–161° C.). See FIG. 2 for an illustration of a NMR spectrum of the above cyclic prepolymer.

A cyclic polyester prepolymer designated PE8F1 has the following schematic:

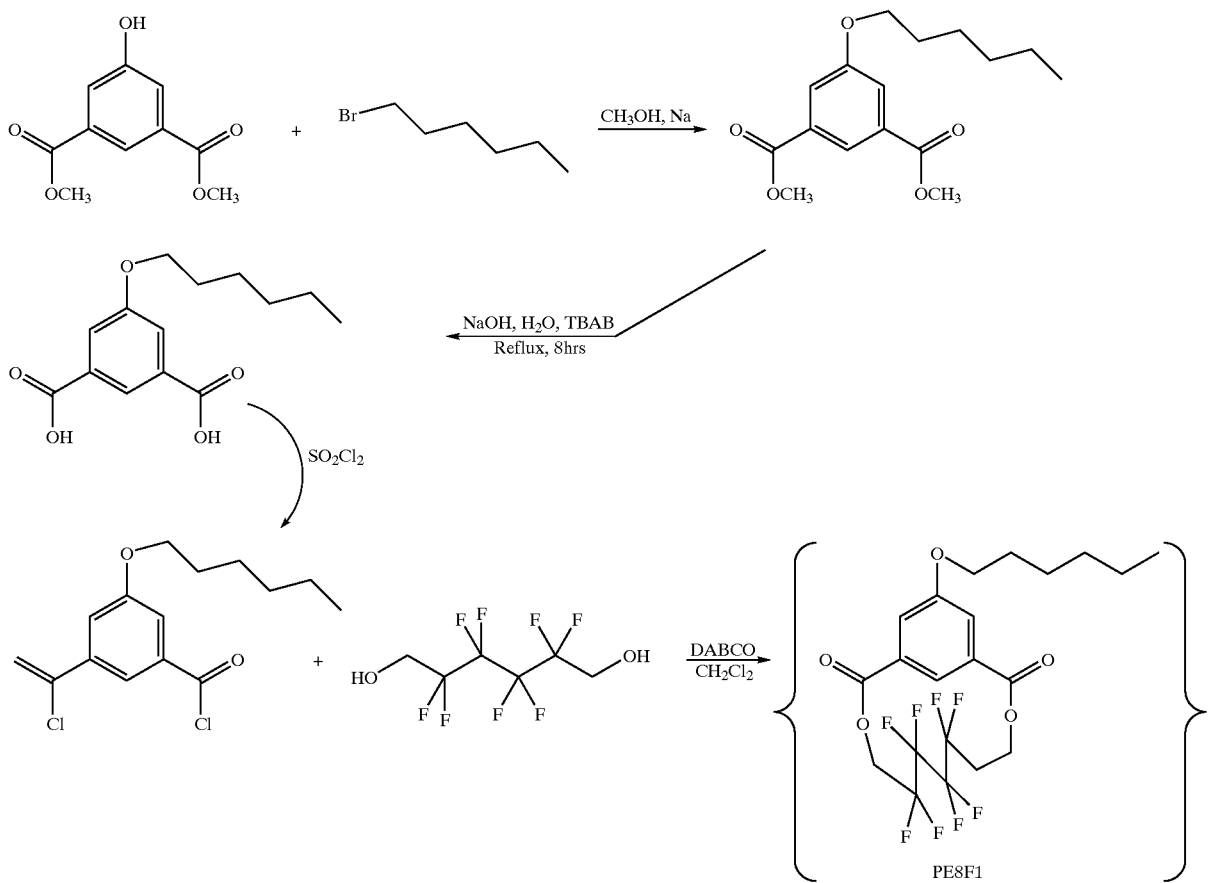

Figure 3:
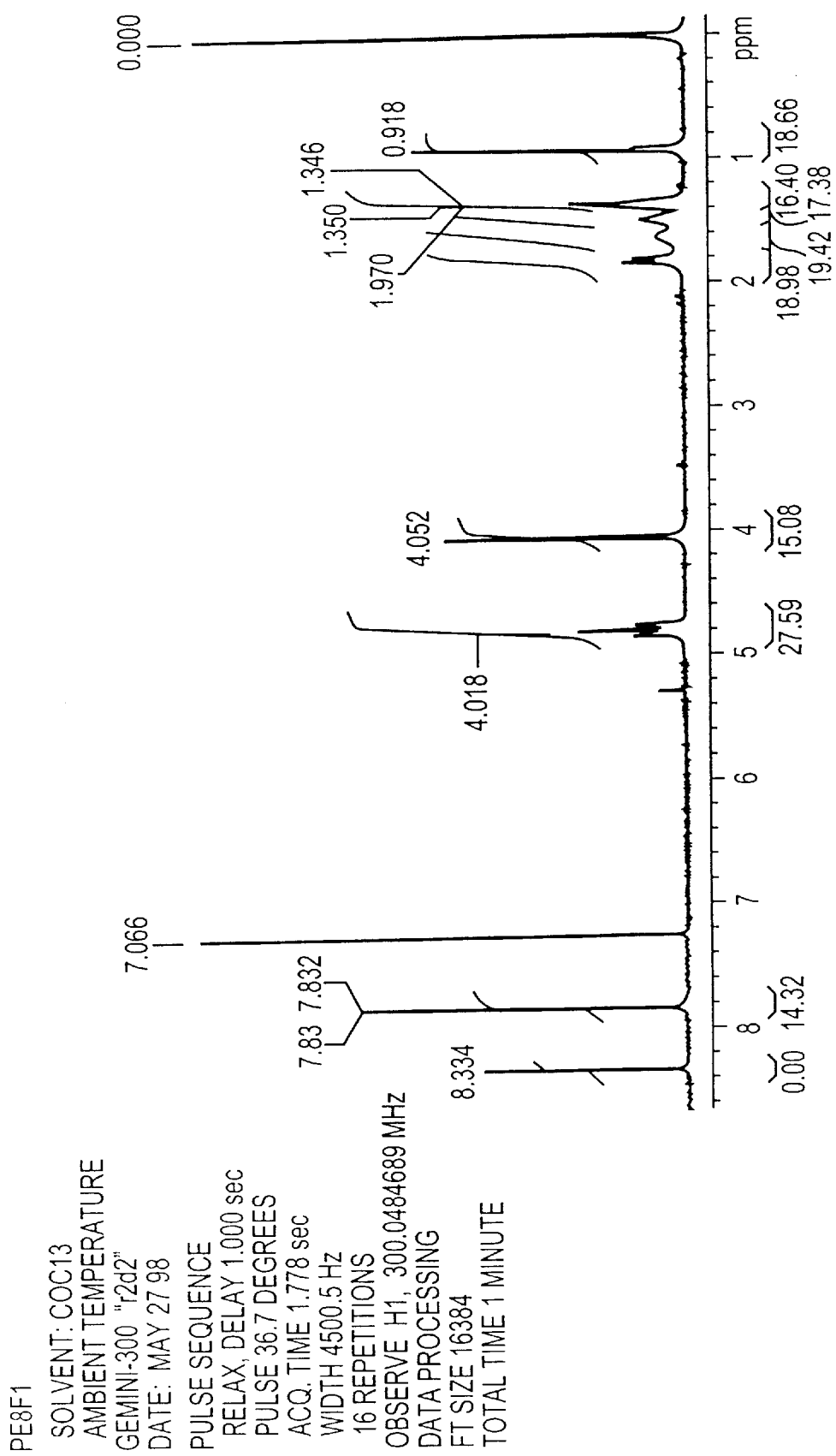
FIG. 3 is a graph of a NMR spectrum for a preferred cyclic prepolymer designated PE8F1.

A three-necked round-bottomed flask is fitted with a big stirring bar, nitrogen purge and septum for reagent addition is charged with 100 ml of methylene chloride and 2.5 grams (25 mmol) of 1,4-diazobicycle[2,2,2]octane(DABCO). The mixture is cooled to less than 0° C. They are separately added in a nitrogen atmosphere over 30 minutes. With stirring, a solution of 1.32 grams 2,2,3,3,4,4,5,5-octafluoro-1, 6-Hexanediol (5 mmol) in 2 ml of anhydrous THF and 18 ml of anhydrous methylene chloride, and a solution of 1.6 grams (5 mmol) of 5-hexoxyl-isophthaloyl chloride in 20 ml of methylene chloride. Stirring is continued for 5 minutes after adding is completed, and then 1 ml of methanol is added to quench the reaction. Thereafter, 25 ml of 1.0 M HCl solution is added and stirred for another 5 minutes. The aqueous layer is washed with methylene chloride. More HCl solution is added to wash the combined methylene chloride solution. It is then washed with a saturated sodium chloride solution. After evaporation of methylene chloride, the residual is recrystallized with a mixture of ethyl ether and methylene chloride. A white powder is obtained. (Yield: 35%, M.P.: 169– 170° C). See FIG. 3 for an illustration of a NMR spectrum of the above cyclic prepolymer.

The specific approach of the present invention is to replace solvent-based liquid/gas phase spray coating processes with a process that has inherently provided low VOC by utilizing either a liquid coating based on these prepolymers that can be applied as a hot liquid spray, can be applied as a liquid room temperature spray and heated on the substrate using external heating sources, or a solid particulate feed stock and a specialized spray gun.

As can be seen in the above embodiments, the produced inventive cyclic prepolymers were prepared under an inert atmosphere in using an organic based solvent system.

We have conceived that other synthesis routes to urethanes and polyesters can be developed for use as coatings. The following illustrates the same synthesis using terepthalic acid and additional illustrations show alternative synthesis routes to proposed "polyester" similar to that shown above using bisphenol A with either adipic acid or terepthalic acid as the esterfication element. Further illustrations show how urethanes may be synthesized via cyclicization.

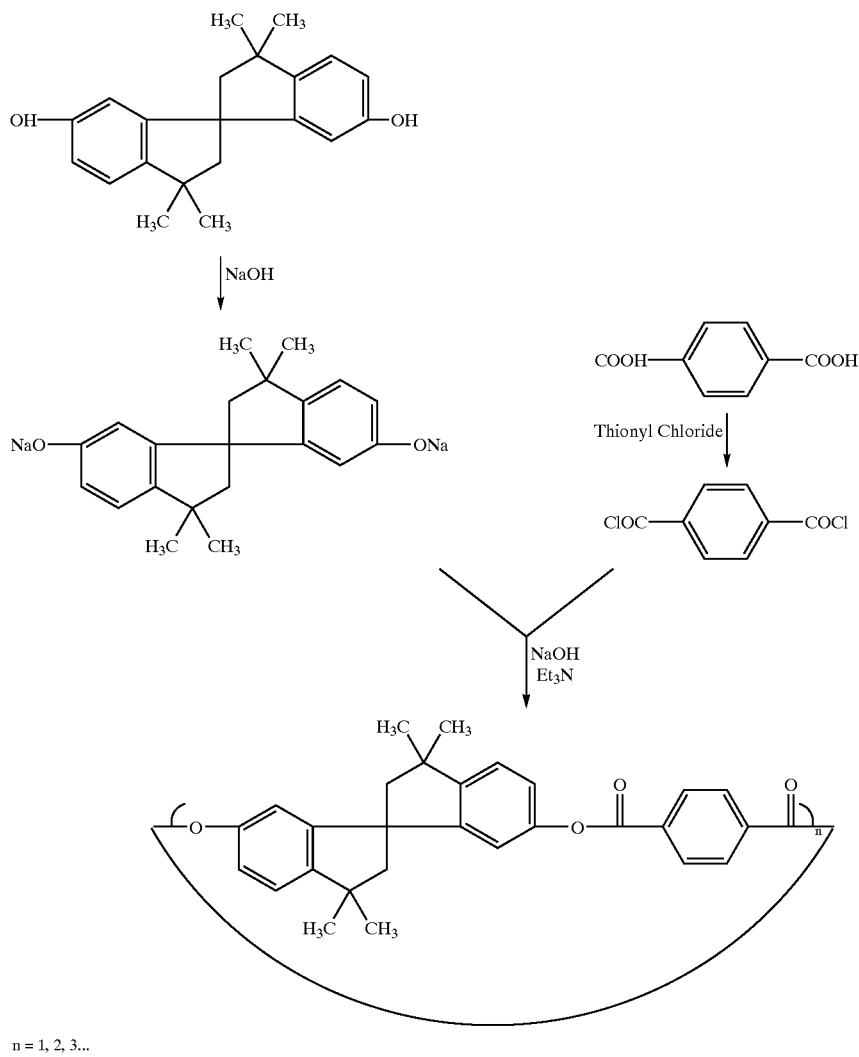

n = 1, 2, 3...

The above is a scheme for the synthesis of proposed polyester cyclics starting with spiro(bis)indane and using terepthalic acid.

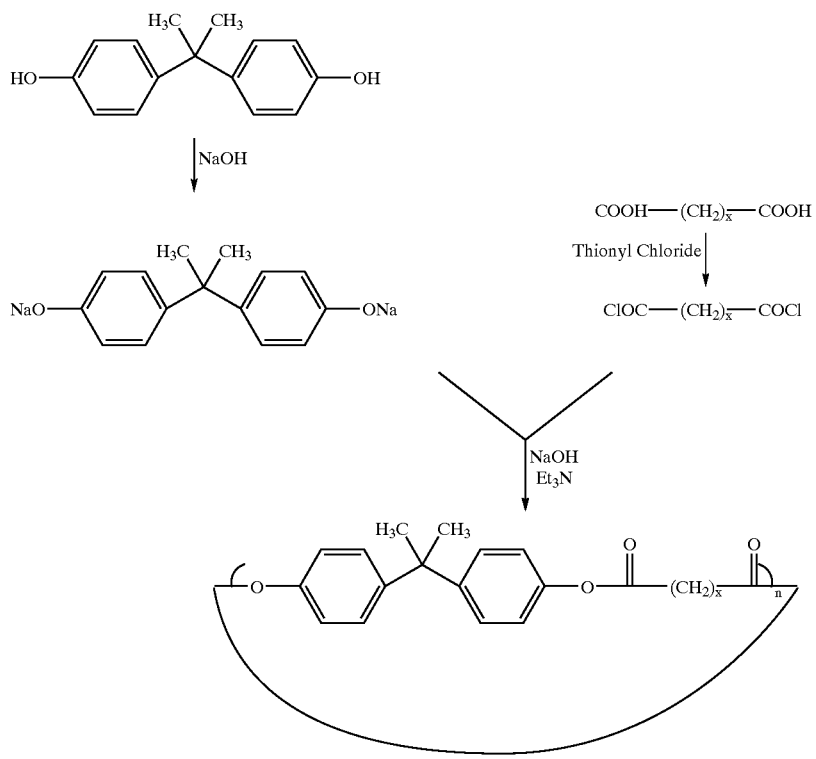
X = 2, 4; n = 1, 2, 3...
The above is a scheme for the synthesis of proposed polyester cyclics starting with bisphenol A and using adipic acid.
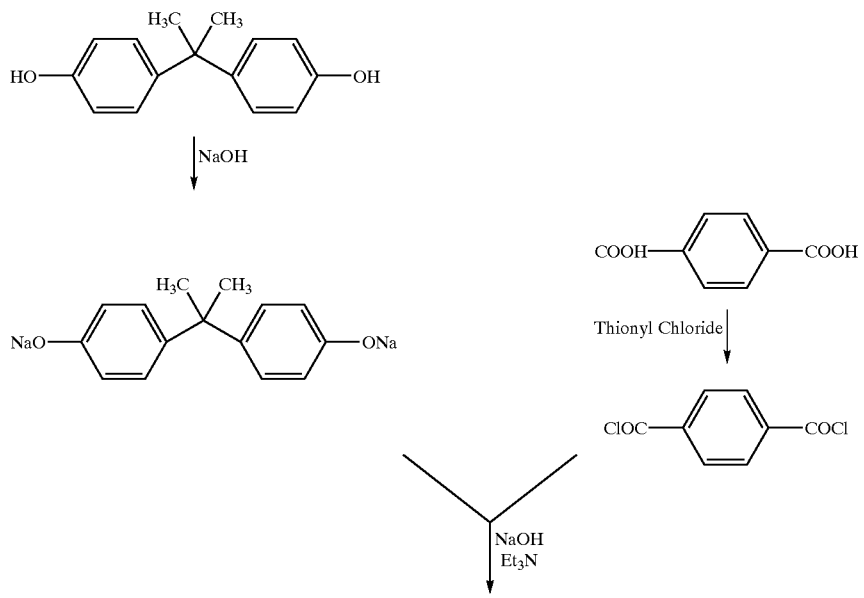

-continued

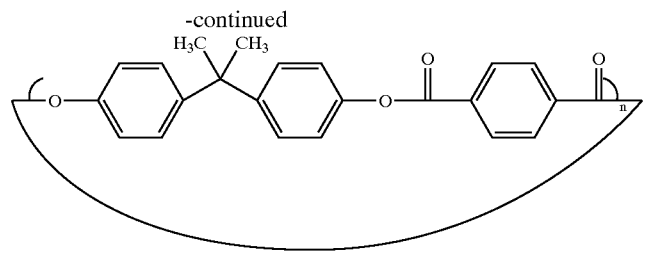

n = 1, 2, 3...

The above is a scheme for the synthesis of proposed polyester cyclics using bisphenol A and terphtalic acid.

Polyester cyclics are very attractive for coating. They have very low viscosity, on the order of 0.07 poise at 250° C. They yield semicrystalline polymers with melting points of ~200° C. with excellent solvent resistance. The processing sequence can allow simultaneous polymerization and crystallization, or isothermal processing.

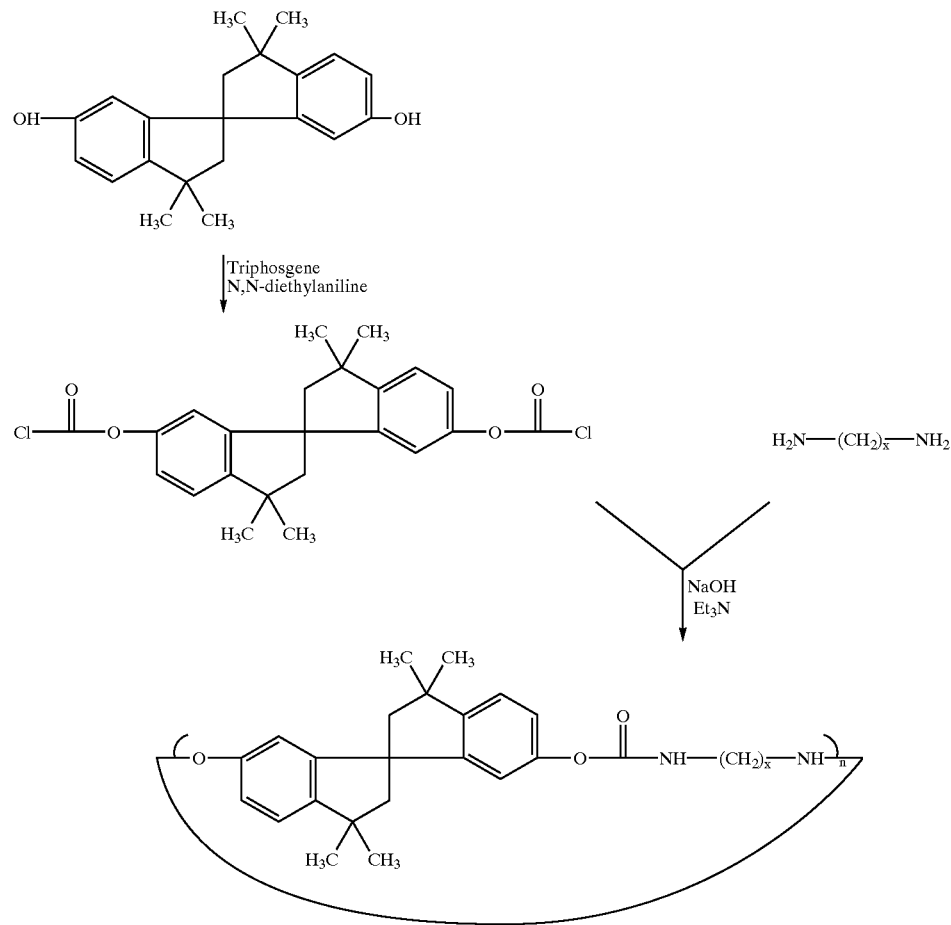

X = 2, 4, 6; n = 1, 2, 3.

The above is a scheme for the synthesis of proposed polyurethane cyclics using spiro(bis)indane.

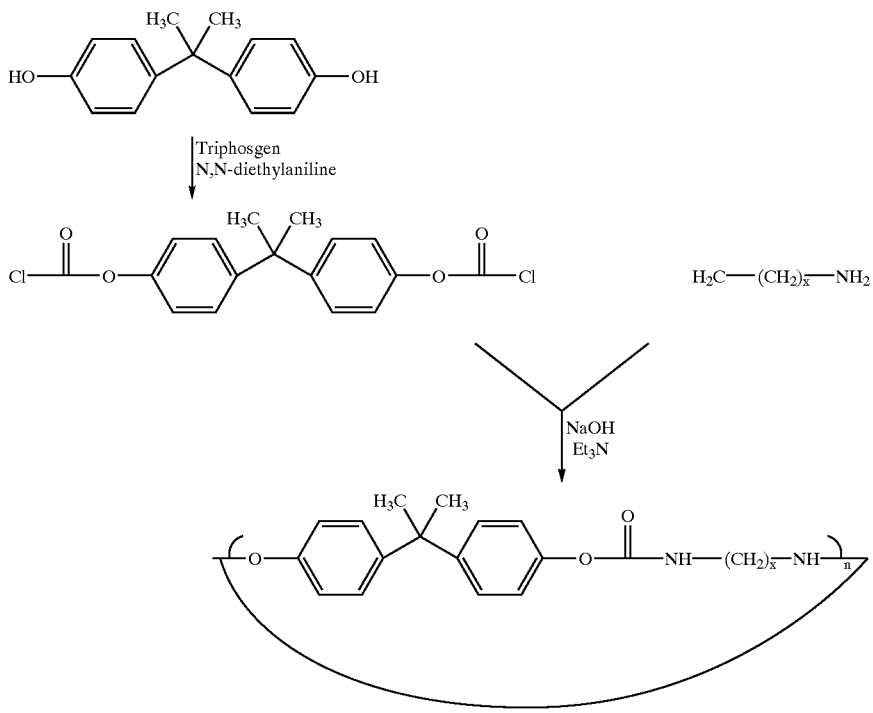

X = 2, 4, 6; n = 1, 2, 3...

The above is a scheme for the synthesis of proposed polyurethane cyclics using bisphenol A as a starting material.

Cyclic prepolymers (i.e., cyclic oligomers) can be modified for desirable binder properties. For example, fluorine substitution can be used to reduce surface free energy and alkyl substitution can be used to increase flexibility. Table 4 summarizes some of the novel modification of cyclic prepolymers and additives that can be achieved to impart desirable properties in coatings. Teflon fillers can be added to achieve further limited wetting by water to impart anti-icing characteristics. UV stabilizers and anti-oxidants are essential elements. Compatiblizers such as dimethylsiloxane cyclics (possibly fluoro-substituted) can be added to enhance flexibility and bonding of the Teflon fillers in the fluoro-substituted cyclics. Rather than adding fluoro substituted diamethysiloxane cyclics prepolymers or Teflon fillers, a novel approach is to add fluoro-substituted moitia directly to the cyclic prepolymer.

TABLE 4

Modifications of Cyclic Prepolymers

Flouro- substituted aromatics - lower surface free energy
Alkyl substituted aromatics - coating flexibility
UV stabilizers
Powdered fluorocarbon fillers
Compatibilizers
Antioxidants
Pigments The advantage of cyclic prepolymers is the low starting viscosity that allows wetting and coalescence of spray. In the presence of a suitable initiator (catalyst), or elevated temperature the cyclic structure opens and the polymerization proceeds accompanied by increase in viscosity and setting like a thermosetting polymer. Experimental data show that the speed of polymerization can be controlled over a wide range. Polymerization proceeds by ring opening and chain linking without evolution of volatile ROH groups.

Cyclic prepolymers with a very low viscosity can be used to formulate a binder and coating without the use of highly volatile solvents. Because of the thermoplastic nature of the uninitiated prepolymer, slowly evaporating solvents used for controlling coalescence are needed. The use of initiators and thermal energy alone promotes polymerization alone.

The maximum VOC level achieved in coatings with organic solvent based systems and conventional polymerization is between 84 g/l and 320 g/l. The latter value is at or above the current VOC limit. Radiation curable coatings do not appear to be able to reach much below the higher value and pigmented radiation hardenable coatings may have adhesion or curing problems as the pigments shadow the underlying coating from the radiation. Additives to coatings to promote polymerization and to achieve UV stabilization seriously complicate this approach to aerospace topcoating.

The use of cyclic prepolymer chemistry to produce very low viscosity resins whose polymerization (ring opening and binding) is thermally and/or chemically initiated is warranted.

The initial evaluation of cyclic compounds focused on identifying available sources. One source of prepolymers could be the byproduct of production of polyester fiber for the textile industry. Polyesters such as ethylene terepthalate are spun through fine orifices, and the frictional forces tend to break the polymer chains of the surface of the fiber. A percentage of the broken chains bind on themselves producing a cyclic waste product with a unit length of 3–5. This material ends up as a waste powder residue from the spinning process.

This impure material contains a mixture of cyclic and linear prepolymers. The cyclic prepolymer is extracted by the method of $CO_2$ extraction and purified to yield several grams. An optimum amount of residual water is necessary in the process to extract the cyclic ethylene terepthalate.

Figure 5A:
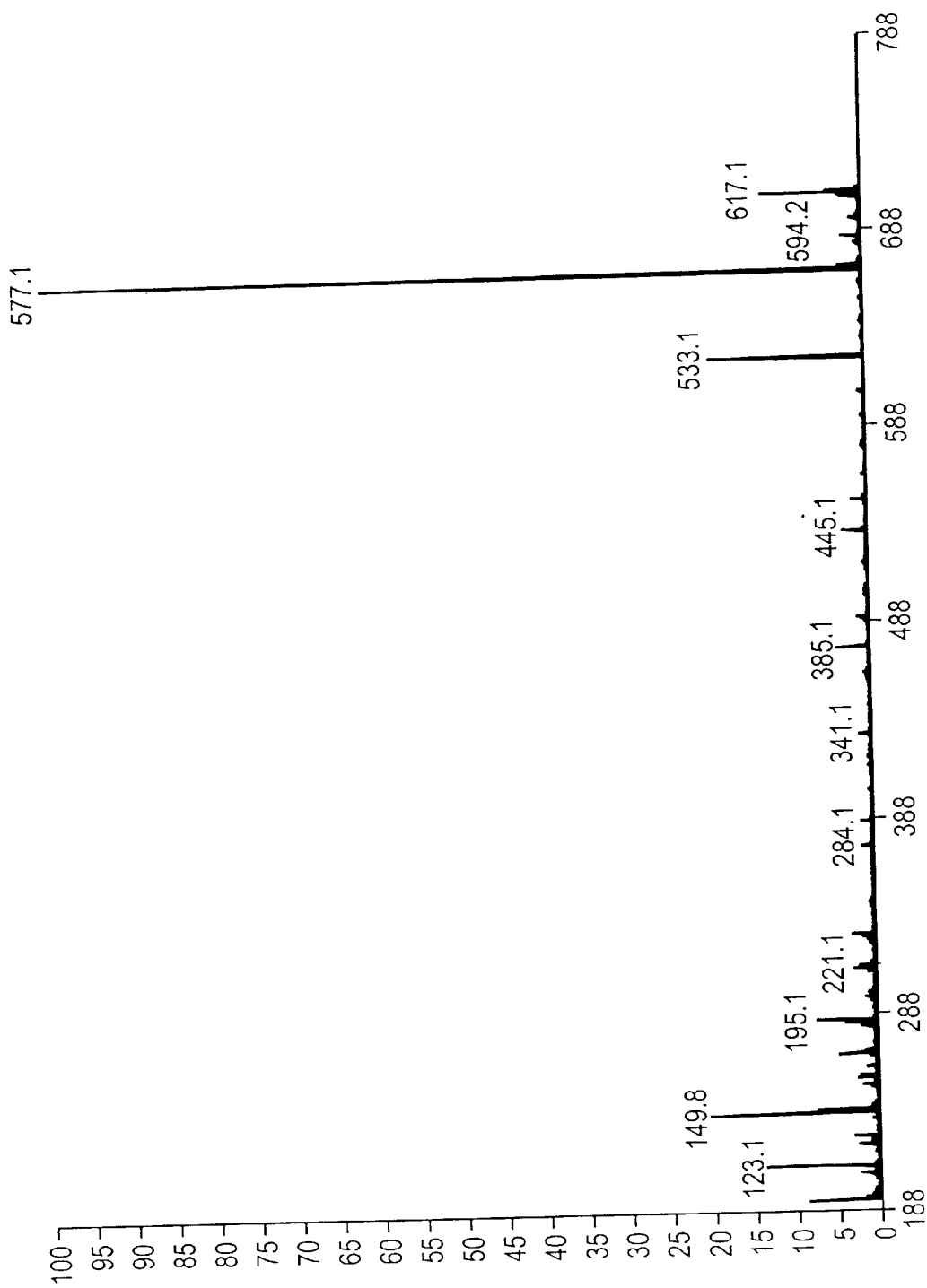
FIG. 5(a) is a trimer baseline of a mass spectroscopy for a cyclic trimer of polyester.
Figure 5B:
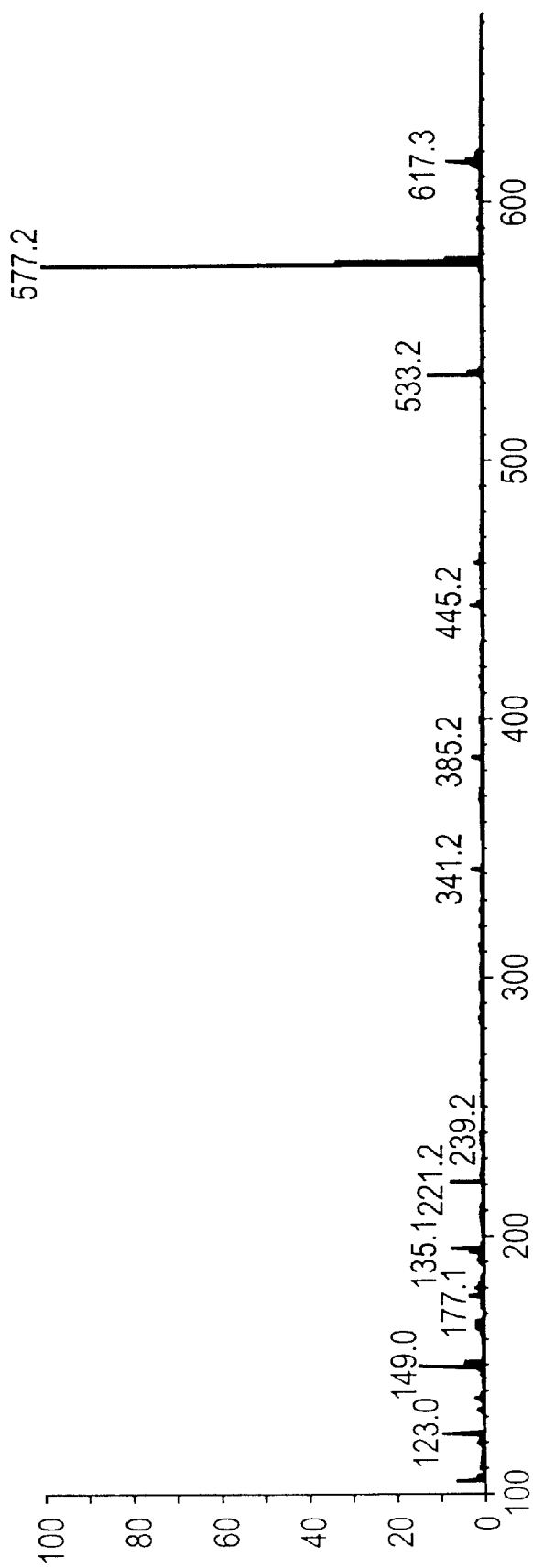
FIG. 5(b) is a mass spectroscopy of an extracted product according to the present invention.
Figure 6:
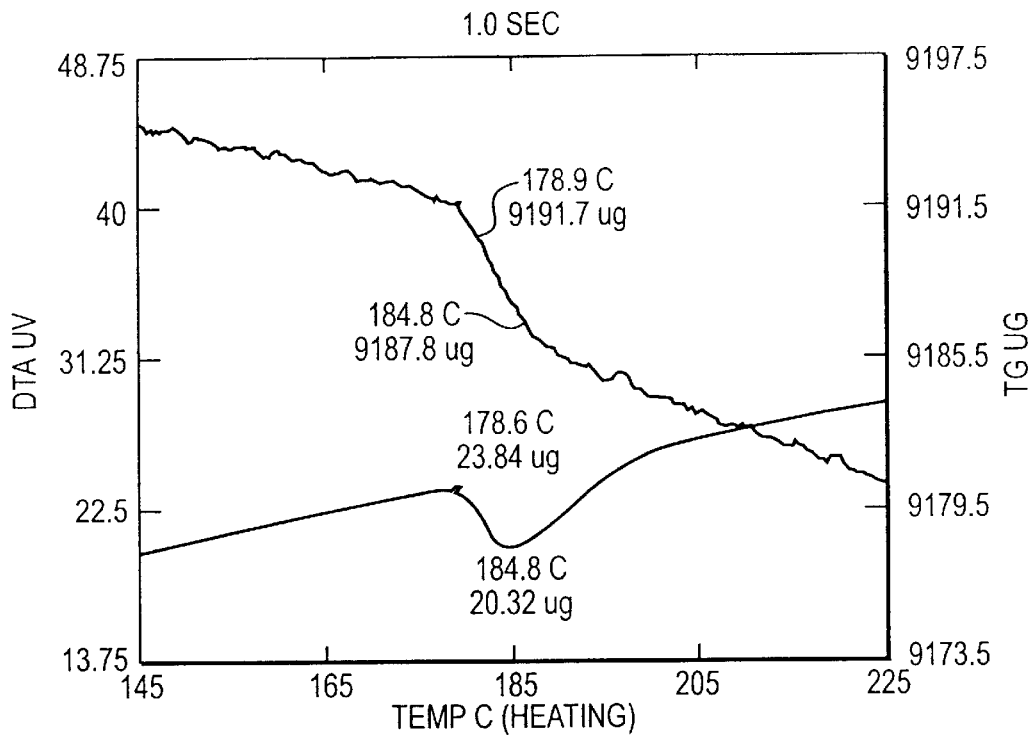
FIG. 6 is a graph illustrating a TGA scan of the ethylene terepthalate cyclic compound.

As illustrated in FIGS. 5(a) and 5(b), mass spectrometry of ethylene terepthalate cyclic compound wherein the extracted material is essentially comprised of 3 unit cycles. The upper scan, FIG. 5(a) is the pure trimer baseline. The lower scan, FIG. 5(b), is the product of the extraction process of the present invention. Note the extracted product appears to be essentially the trimer. Thermogravimetric analysis, see FIG. 6, shows a TGA scan of the elthylene terepthalate cyclic compound wherein the material exhibits two endothermic reactions usually associated with melting. The first reaction is at ~185° C. (365° F.) and the other at ~296° C. (565° F.). A final reaction at ~315° C. (600° F.) reflects decomposition or oxidation of the compound. If melting is observed at ~185° C. (365° F.), this compound may be at the high end of the temperature range for useful development of a coating binder for thermal spray or thermally curing coatings.

Simple melting experiments in which a small quantity of the prepolymer is spread on a aluminum panel and placed in a vacuum furnace held about 5° C. over the first indicated melting reaction. The furnace was allowed to recover and the panel was held at 190° C. while visually observing the material. No melting was apparent after hold times up to 15 minutes.

Similar melting experiments are conducted at temperatures between 295 and 310° C. In these cases visible degradation of the polymer is noted by color change but no melting is observed. We conclude that the melting range is high enough that oxidation and decomposition are competing reactions.

Attempts were made to reduce the melting range by incorporation of another polymer in the cyclic ring such as polysiloxane cyclics. After some effort this showed no success.

A synthesis is conducted to determine if bisphenol A polycarbonate could be reproduced. Triphosgene, a solid that is more readily handled and controlled is used as the starting material. BPA-PC material is produced after limited experimentation.

Figure 7:
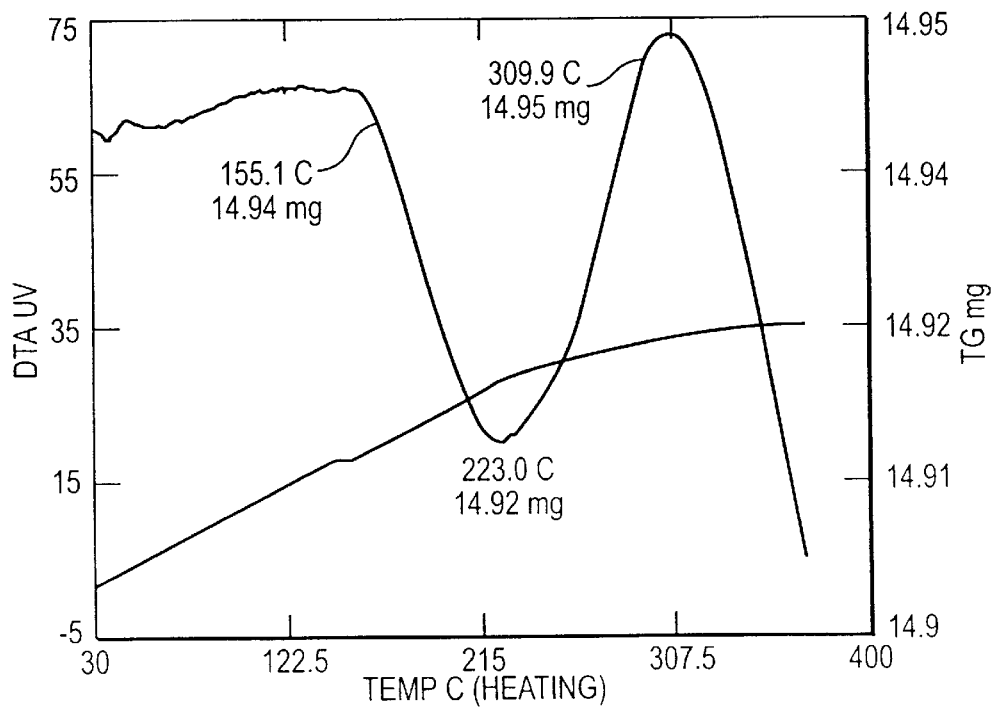
FIG. 7 is a graph illustrating a TGA of experimential BPA polycarbonate showing a melting range of 150–223° C.

FIG. 7 shows the TGA analysis of the cyclic compound. FIG. 7 illustrates the TGA of experimental BPA polycarbonate showing a melting range of 150–223° C.

The notable element of the TGA analysis is the wide melting range. There is a clear melting range at about 155° C. to 223° C. (The previous ethylene terephthalate showed marginal signs of melting at ~320° C.) Simple melting experiments are conducted on this material. A quantity of the compound is spread on small squares of aluminum sheet (~2 inch, 5.08 cm.) and the panels are placed in a closed preheated oven held at 220° C. Visable evidence of melting is observed by a change in appearance of the compound from opaque white to transparent and some evidence of very slow fusing of powder over a 15 minute hold interval. The fusing occurred very slowly and did not appreciably accelerate as temperature was increased. All TGA is done at 20° C./min heating rate under flowing nitrogen.

The effects of both surface tension (substrate wetting) and viscosity are noted. The molten compound tended to "bead" rather than flow and flatten on the epoxy primered substrate. In addition, the apparent viscosity of the prepolymer seemed high as adjacent touching "islands" of melted compound only slowly coalesced and formed larger, single areas. Polmer free BPA polyvcarbonate is claimed to have a viscosity of ~10 poise at 250° C. However the apparent viscosity of the material produced in this study is much higher. Such results can be expected in initial synthesis, if small amounts of linear polymer or long chain cyclics are present in the compound.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coating process, comprising the following steps:
    (a) selecting cyclic prepolymers from the group consisting of polyester, polycarbonate and polyurethane;
    (b) applying the cyclic prepolymers to a surface by a thermal spray or a spray method which uses heat of thermal deposition;
    (c) ringbreaking the cyclic prepolymers with a catalyst or heat to polymerize the cyclic prepolymers, while substantially avoiding the evolution of organic content; and
    (d) heat curing the cyclic prepolymers to complete polymerization of the cyclic prepolymers, to thereby form a coating on said surface.

2. A coating process, comprising the following steps:
    (a) selecting cyclic prepolymers from the group consisting of polyester, polycarbonate and polyurethane;
    (b) ringbreaking the cyclic prepolymers with a catalyst or heat to polymerize the cyclic prepolymers, while substantially avoiding the evolution of organic content to form a compound;
    (c) applying the cyclic propolymers to a surface by a thermal spray or a spray method which uses heat of thermal deposition; and
    (d) heat curing the cyclic prepolymers to complete polymerization of the cyclic prepolymers, to thereby form a coating on said surface.

3. The coating process according to claim 1, wherein the cyclic prepolymer possesses a structure selected from the group consisting of an ester prepolymer structure and an urethane prepolymer structure, wherein each of said prepolymers possesses a liquid viscosity of about 0.07 poise to about 10 poise at about 250° C., and which when heated or otherwise catalyzed to break their cyclic rings, polymerize into polyesters or polyurethane while substantially avoiding the evolution of organic content.

4. The coating process according to claim 3, wherein the cyclic prepolymers possess substituent groups that contain unsaturated bonds, and said cyclic prepolymers forming a thermosetting, crosslinked coating in said process.

5. The coating process according to claim 3, wherein the cyclic prepolymers exist in the form of a blend of cyclic prepolymers, said blend comprising
    (i) cyclic prepolymers that possess substituent groups that contain unsaturated bonds that are capable of forming a thermosetting, crosslinked coating in said process, and
    (ii) cyclic prepolymers that are non-crosslinking and that are capable of forming a thermoplastic coating in said process;
        whereby the coating prepared by said process possesses properties of hardness, flexibility, strength, durability and toughness.

6. The coating process according to claim 3, wherein the cyclic prepolymers contain fluorinated side groups.

7. A cyclic prepolymer prepared by a process that comprises reacting together under an inert atmosphere in an organic based solvent system:
   (a) a butanediol or a hexanediol, and
   (b) a cyclic moiety having a cyclic ring structure containing 4–8 carbon atoms that is substituted with (i) a pair of chloro substituted acyl groups and (ii) a substituent containing an unsaturated bond.

8. The cyclic prepolymer according to claim 7, wherein 1,4-diazobicycle[2,2,2]octane (DABCO) is present in the organic based solvent system.

9. The cyclic prepolymer according to claim 7, wherein the cyclic moiety is 5-hexoxyl-isophthaloyl chloride.

10. The cyclic prepolymer according to claim 7, wherein the butanediol is 2,2,3,3-tetrafluoro-1,4-butanediol and the hexanediol is 2,2,3,3,4,4,5,5-octafluoro-1,6-hexanediol.

11. A method of manufacturing a cyclic polyester prepolymer comprising the step of reacting 2,2,3,3-tetrafluoro-1,4-butanediol with isophthaloyl chloride under an inert atmosphere in an organic based solvent system.

12. The method according to claim 11, wherein 1,4-diazobicycle[2,2,2]octane (DABCO) is present in the organic based solvent system.

13. A method of manufacturing a cyclic polyester prepolymer comprising the step of reacting 2,2,3,3-tetrafluoro-1,4-butanediol with 5-hexoxyl-isophthaloyl chloride under an inert atmosphere in an organic based solvent system.

14. The method according to claim 13, wherein 1,4-diazobicycle-[2,2,2]octane (DABCO) is present in the organic based solvent system.

15. A method of manufacturing a cyclic polyester prepolymer comprising the step of reacting 2,2,3,3,4,4,5,5-octafluoro-1,6-hexanediol with isophthaloyl chloride under an inert atmosphere in an organic based solvent system.

16. The method according to claim 15, wherein 1,4-diazobicycle[2,2,2]octane (DABCO) is present in the organic based solvent system.

17. A method of manufacturing a cyclic polyester prepolymer comprising the step of reacting 2,2,3,3,4,4,5,5-octafluoro-1,6-hexanediol with 5-hexoxyl-isophthaloyl chloride under an inert atmosphere in an organic based solvent system.

18. The method according to claim 17, wherein 1,4-diazobicycle[2,2,2]octane (DABCO) is present in the organic based solvent system.

* * * * *

UNITED STATES PATENT AND TRADEMARK OFFICE
CERTIFICATE OF CORRECTION

PATENT NO.     : 6,432,486 B1
DATED          : August 13, 2002
INVENTOR(S)    : Paris et al.

It is certified that error appears in the above-identified patent and that said Letters Patent is hereby corrected as shown below:

<u>Title page,</u>
Item [75], Inventor, please change "Zhengui Liu, Greenville, SC (US)" to
-- Zhenguo Liu, Greenville, SC (US) --

Signed and Sealed this

Sixth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,432,486 B1
DATED         : August 13, 2002
INVENTOR(S)   : Paris et al.

It is certified that error appears in the above-identified patent and that said Letters Patent is hereby corrected as shown below:

Title page,
Item [73], Assignee, please change "Delta Airlines, Inc., Atlanta, GA (US)" to -- Delta Air Lines, Inc., Atlanta, GA (US) --

Signed and Sealed this

Twenty-eighth Day of December, 2004

JON W. DUDAS
*Director of the United States Patent and Trademark Office*